US010581116B2

(12) United States Patent
Choi et al.

(10) Patent No.: US 10,581,116 B2
(45) Date of Patent: Mar. 3, 2020

(54) ELECTROLYTE MEMBRANE FOR ENERGY STORAGE DEVICE, ENERGY STORAGE DEVICE INCLUDING THE SAME, AND METHOD OF PREPARING THE ELECTROLYTE MEMBRANE FOR ENERGY STORAGE DEVICE

(71) Applicant: Samsung Electronics Co., Ltd., Suwon-si, Gyeonggi-do (KR)

(72) Inventors: Hongsoo Choi, Seoul (KR); Yonggun Lee, Incheon (KR); Jenam Lee, Incheon (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 88 days.

(21) Appl. No.: 14/719,460

(22) Filed: May 22, 2015

(65) Prior Publication Data

US 2016/0064772 A1    Mar. 3, 2016

(30) Foreign Application Priority Data

Aug. 26, 2014 (KR) .................. 10-2014-0111632

(51) Int. Cl.
  *H01M 10/0565* (2010.01)
  *H01M 10/0525* (2010.01)
  *H01G 11/52* (2013.01)
  *H01G 11/04* (2013.01)

(52) U.S. Cl.
  CPC ........ *H01M 10/0565* (2013.01); *H01G 11/52* (2013.01); *H01M 10/0525* (2013.01); *H01G 11/04* (2013.01); *H01M 2300/0082* (2013.01); *Y02E 60/13* (2013.01); *Y02T 10/7011* (2013.01); *Y02T 10/7022* (2013.01)

(58) Field of Classification Search
  CPC ......... H01M 10/0565; H01M 10/0525; H01M 2300/0082; H01G 11/52; H01G 11/04; Y02E 60/13; Y02T 10/7011; Y02T 10/7022
  See application file for complete search history.

(56) References Cited

U.S. PATENT DOCUMENTS

| | | | |
|---|---|---|---|
| 2012/0077092 A1* | 3/2012 | Lee .................. | C08J 5/2206 429/307 |
| 2012/0115961 A1* | 5/2012 | Hafizovic ........... | B01J 31/1691 514/772 |
| 2016/0064773 A1 | 3/2016 | Choi et al. | |

FOREIGN PATENT DOCUMENTS

| | | |
|---|---|---|
| KR | 10-0746347 B1 | 7/2007 |
| KR | 10-0896111 B1 | 4/2009 |
| KR | 1020120031738 A | 4/2012 |
| KR | 1020120108829 A | 10/2012 |
| KR | 10-1432862 B1 | 8/2014 |

OTHER PUBLICATIONS

Appetecchi et al., "Hot-pressed, dry, composite, PEO-Based electrolyte membranes I. Ionic conductivity characterization", Journal of Power Sources, 114, 2003, pp. 105-112.
Shin et al., "PEO-Based Polymer Electrolytes with Ionic Liquids and Their Use in Lithium Metal-Polymer Electrolyte Batteries", Journal of the Electrochemical Society, 152(5), 2005, A978-A983.
Wiers et al., "A Solid Lithium Electrolyte via Addition of Lithium Isopropoxide to a Metal-Organic Framework with Open Metal Sites", Journal of the American Chemical Soicety, 133, 2011, pp. 14522-14525.
Yuan et al., "Enhanced electrochemical performance of poly(ethylene oxide) based composite polymer electrolyte by incorporation of nano-sized metal-organic framework", Journal of Power Sources, 240, 2013, pp. 653-658.
Fano et al., "Ionization Yield of Radiations. II. The Fluctuations of the Number of Ions", Physical Review, vol. 72, No. 1 Jul. 1, 1947 p. 1-4.
Research Interests, "Development of porous materials", 2017, Retrieved from Internet;https://web.us.es/imaWebpersonal/Research%20Interests. htm, accessed on May 11, 2017.
Murata et al., "An overview of the reserch and development of solid polymer electrolyte batteries", Electrochimica Acta, 45, 2000, pp. 1501-1508.

\* cited by examiner

*Primary Examiner* — Gregg Cantelmo
(74) *Attorney, Agent, or Firm* — Cantor Colburn LLP

(57) ABSTRACT

An electrolyte membrane for an energy storage device, an energy storage device including: a matrix including an ionically conductive polymer composition including a polymer and a lithium salt; and a metal-organic framework in the matrix, wherein the metal-organic frame work is in the form of a plurality of primary particles, each having diameter distribution represented by Inequation 1:

$$0 < \sigma^2/\mu < 1.0 \quad \text{Inequation 1}$$

wherein, in Inequation 1, $\sigma^2$ is a diameter variance for the plurality of primary particles obtained by dynamic laser scattering, and $\mu$ is an average particle diameter of the plurality of primary particles.

19 Claims, 11 Drawing Sheets

ELECTROLYTE MEMBRANE FOR ENERGY STORAGE DEVICE, ENERGY STORAGE DEVICE INCLUDING THE SAME, AND METHOD OF PREPARING THE ELECTROLYTE MEMBRANE FOR ENERGY STORAGE DEVICE

RELATED APPLICATIONS

This application claims priority to and the benefit of Korean Patent Application No. 10-2014-0111632, filed on Aug. 26, 2014, and all the benefits accruing therefrom under 35 U.S.C. § 119, in the Korean Intellectual Property Office, the disclosure of which is incorporated herein in its entirety by reference.

BACKGROUND

1. Field

The present disclosure relates to an electrolyte membrane for an energy storage device, an energy storage device including the electrolyte membrane, and a method of preparing the electrolyte membrane for an energy storage device.

2. Description of the Related Art

Energy storage devices, such as lithium batteries or supercapacitors, are rechargeable and are applicable in a wide range of fields, including portable electronic devices such as mobile phones and MP3 players, and electric vehicles such as hybrid electric vehicle, and plug-in hybrid electric vehicles.

Lithium batteries or supercapacitors may be classified depending on the variety and classification of the electrolyte thereof. For example, lithium batteries using liquid electrolytes are called lithium ion batteries, and lithium batteries that use polymer electrolytes are called lithium polymer batteries.

With the recent market growth of high-performance mobile electronic devices and long-distance electric vehicles, the need for high-performance storage devices with high energy density and high power is increasing.

However, due to safety issues with lithium ion batteries, such as a risk of fire or explosion by thermal runaway, such as that caused by an organic solvent in the liquid electrolyte thereof, there is an increasing need for a polymer electrolyte not using a liquid electrolyte and an energy storage device including the polymer electrolyte.

SUMMARY

Provided is an electrolyte membrane for energy storage devices.

Provided is an energy storage device using the electrolyte membrane.

Provided are methods of manufacturing the electrolyte membrane for energy storage devices.

Additional aspects will be set forth in part in the description which follows and, in part, will be apparent from the description.

According to an aspect, an electrolyte membrane for an energy storage device includes: a matrix including an ionically conductive polymer composition including a polymer and a lithium salt; and a metal-organic framework (MOF) in the matrix, wherein the metal-organic frame work is in a form of a plurality of primary particles, each having a diameter distribution represented by Inequation 1:

$$0 < \sigma^2/\mu < 1.0 \qquad \text{Inequation 1}$$

wherein, in Inequation 1, $\sigma^2$ is a diameter variance for the plurality of primary particles obtained by dynamic laser scattering (DLS), and $\mu$ is an average particle diameter of the plurality of primary particles.

According to another aspect, an energy storage device includes: a cathode; an anode; and an electrolyte disposed between the cathode and the anode and including the electrolyte membrane.

According to another aspect, a method of preparing an electrolyte membrane for an energy storage device includes: adding an metal ion precursor, an organic ligand precursor, and a solvent to prepare a metal-organic framework (MOF); adding a matrix including an ionically conductive polymer composition including a polymer and a lithium salt to a solvent to obtain a mixture; and adding the metal-organic framework to the mixture to form a composition; disposing the composition on a substrate to form the electrolyte membrane, wherein the electrolyte membrane includes a matrix including an ionically conductive polymer, a lithium salt, and a metal-organic framework in the matrix, wherein the metal-organic framework is in a form of a plurality of primary particles, each having a diameter distribution represented by Inequation 1:

$$0 < \sigma^2/\mu < 1.0 \qquad \text{Inequation 1}$$

wherein, in Inequation 1, $\sigma^2$ is a diameter variance for the plurality of primary particles obtained by dynamic laser scattering, and $\mu$ is an average particle diameter of the plurality of primary particles.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
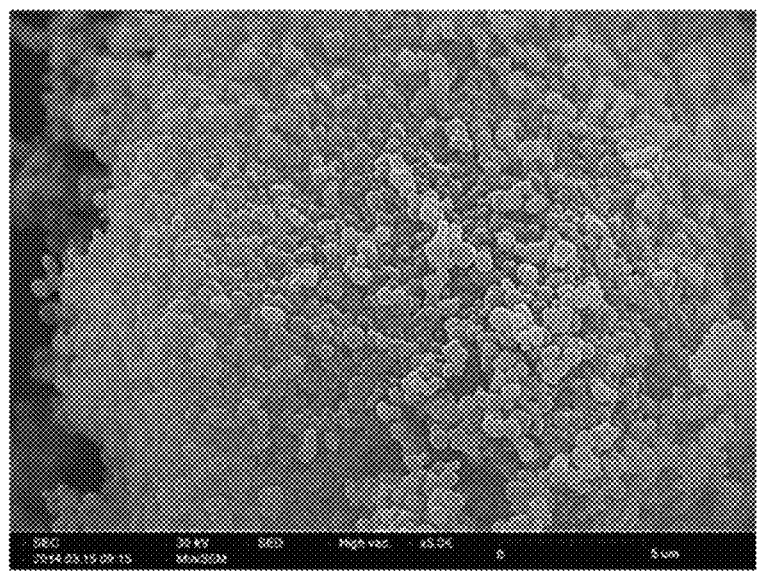
FIG. 1A is a scanning electron microscopic (SEM) image of a metal-organic framework (MIL-125 ($Ti_8O_8(OH)_4(BDC)_6$), wherein BDC is 1,4-benzenedicarboxylate) of Preparation Example 1.

Reference will now be made in detail to embodiments of an electrolyte membrane for an energy storage device, an energy storage device including the electrolyte membrane, and a method of preparing the electrolyte membrane, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an embodiment of the present disclosure, an electrolyte membrane for an energy storage device includes: a matrix including an ionically conductive polymer composition comprising a polymer and a lithium salt; and a metal-organic framework (MOF) in the matrix, wherein the metal-organic frame work is in a form of a plurality of primary particles in the matrix, each having a diameter distribution represented by Inequation 1:

$$0 < \sigma^2/\mu < 1.0 \qquad \text{Inequation 1}$$

wherein, in Inequation 1, $\sigma^2$ is a diameter variance for the plurality of primary particles of the metal-organic framework, obtained by dynamic laser scattering (DLS), which may be equivalent to a square of a standard deviation of average particle diameter of the primary particles of the metal-organic network; and μ is an average particle diameter of the plurality of primary particles. The plurality of primary particles has a diameter distribution having a uniformity which is suitable for an electrolyte membrane for an energy storage device.

A matrix including an ionc conductive polymer, for example, poly(ethylene oxide) (PEO), may have a high electrochemical performance at a high temperature of about 60° C. or higher, but have a very low and inadequate ionic conductivity of about $10^{-6}$ Siemens per centimeter (S/cm) or less at room temperature, and thus may not be suitable for an energy storage device.

While not wanting to be bound by theory, it is understood that the low ionic conductivity is due to a high degree of crystallinity of the ion conductive polymer-including matrix at room temperature that impedes migration of ions. In addition, another drawback with the ion conductive polymer-including matrix is the growth of lithium dendrites, though less than with liquid electrolyte, which may cause a problem when used in an energy storage device.

To address these drawbacks, inorganic particles such as $TiO_2$ may be added to an ion conductive polymer-including matrix of an electrolyte membrane. The inorganic particles may prevent crystalization of the ion conductive polymer-including matrix, and thus may improve the ionic conductivity and mechanical properties of the electrolyte membrane.

However, when inorganic particles such as $TiO_2$ are added to such an ion conductive polymer-including matrix, the inorganic particles may be unlikely to be uniformly dispersed, and rather may agglomerate together, consequentially failing to lower the degree of crystallinity of the ion conductive polymer-including matrix and possibly deteriorating the mechanical properties of an electrolyte membrane including the ion conductive polymer-including matrix. The presence of the inorgainc particles may also impede the migration of ions, which consequentially lowers the ionic conductivity of the electrolyte membrane.

In some embodiments of the present disclosure, the metal-organic framework of the electrolyte membrane, added as a filler to the matrix, may improve the mechanical properties of the electrolyte membrane, like inorganic particles such as $TiO_2$.

The metal-organic framework may be distributed in the form of a plurality of primary particles in the matrix, which are discrete, i.e., not agglomerated together, and having a uniform diameter distribution represented by Inequation 1, close to an average particle diameter, and thus may improve the mechanical properties of the electrolyte membrane, and at the same time may lower the degree of crystallnity of the matrix, and, while not wanting to be bound by theory, is understood to consequentially improve the ionic conductivity at room tempeature and the electrochemical stability of the electrolyte membrane.

The particles of the plurality of primary particles may have a diameter of about 1 nanometer (nm) to about 1 μm, and in some embodiments, about 10 nm to 900 nm, and in some other embodiments, about 100 nm to about 800 nm, and in some other embodiments, about 300 nm to about 600 nm. For example, the plurality of primary particles may comprise particles having a diameter of about 300 nm to about 500 nm.

The plurality of primary particles may comprise particles having any suitable shape, including a spherical shape, an elliptical shape, a cylindrical shape, a triangular shape, a square shape, or a polyhedral shape. Spherical particles are mentioned. The plurality of primary particles may have any of the above-listed shapes. For example, the plurality of primary particles may be spherical.

The metal-organic framework may include a porous crystalline compound.

The metal-organic framework may include a porous crystalline compound in which a metal ion or metal ion cluster is chemically bound to an organic ligand.

The metal ion that forms the metal-organic framework may be any suitable metal ion which is able to form a coordinate or covalent bond, provided that it is electrically stable and does not take part in oxidation or reduction reaction during charge or discharge of an energy storage device.

For example, the metal ion may include at least one selected from $Zn^{2+}$, $Ti^{3+}$, $Ti^{4+}$, $Fe^{2+}$, $Fe^{3+}$, $V^{4+}$, $V^{3+}$, $V^{2+}$, $Y^{3+}$, $Zr^{4+}$, $Cu^{2+}$, and $Al^{3+}$. $Ti^{3+}$ and $Ti^{4+}$ are specifically mentioned. For example, the metal ion may include an oxo-centered metal cluster ion including such a metal ion as listed above.

The organic ligand may include any suitable organic material that includes a functional group, such as a carboxyl group or an imidazole group, that is capable of forming a coordinate, ionic, or covalent bond. Suitable organic ligands for forming stable MOFs may include organic materials having at least two binding sites for coordinate, ionic, or covalent bonding, for example ligands which are bidentate, tridentate, and the like.

In some embodiments, the organic ligand may include at least one selected from an aromatic dicarboxylic acid, an aromatic tricarboxylic acid, and an imidazole-based compound.

Non-limiting examples of the aromatic dicarboxylic acid or aromatic tricarboxylic acid include benzenedicarboxylic acids, such as benzene-1,2-dicarboxylic acid (or o-phthalic acid), benzene-1,3-dicarboxylic acid (or m-phthalic acid) and benzene-1,4-dicarboxylic acid (or p-phthalic acid); benzenetricarboxylic acids, such as benzene-1,3,5-tricarboxylic acid (or trimesic acid); naphthalenedicarboxylic acid, biphenyldicarboxylic acid, or triphenyldicarboxylic acid. For example, the aromatic dicarboxylic acid or aromatic tricarboxylic acid may include a compound represented by any one of Formulas 1 to 5.

Formula 1

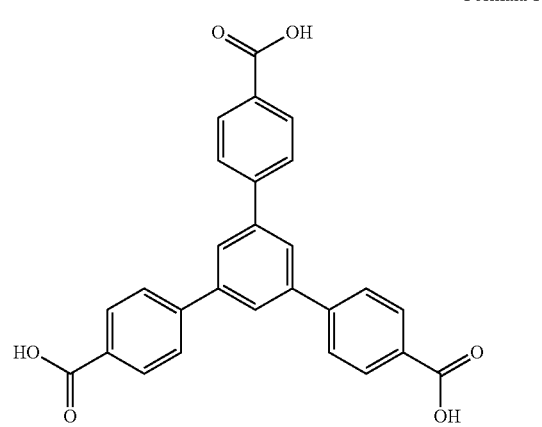

Formula 2
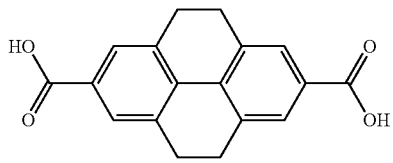

Formula 3
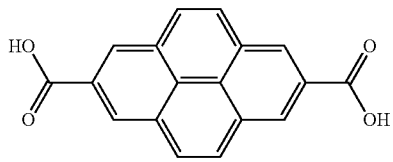

Formula 4
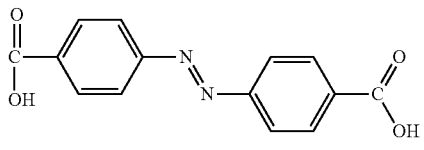

Formula 5
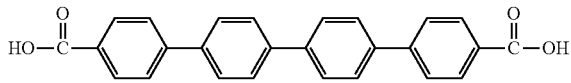

Non-limiting examples of the imidazole-based compound include imidazole or benzoimidazole.

The porous crystalline compound may have an average pore diameter of about 1 nm to about 10 nm, and in some embodiments, about 1 nm to about 8 nm, and in some other embodiments, about 1 nm to about 5 nm. For example, the metal-organic framework may have a mesoporous structure.

The metal-organic framework may have a specific surface area of about 100 square meters per gram (m²/g) or greater, and in some embodiments, about 500 m²/g or greater, and in some other embodiments, about 1000 m²/g or greater, or about 100 m²/g to about 1000 m²/g, or about 200 m²/g to about 500 m²/g. When the metal-organic framework has a specific surface area within these ranges, the electrolyte membrane may have an improved ionic conductivity at room temperature.

The amount of the metal-organic framework may be in a range of about 0.1 weight percent (wt %) to about 50 wt %, or about 0.1 wt % to about 50 wt %, or about 0.1 wt % to about 50 wt %, based on a total weight of the electrolyte membrane for an energy storage device.

The matrix including the ionically conductive polymer composition may be a matrix in which the ionically conductive polymer composition comprises a salt, such as a lithium salt, such as LiPF$_6$, and a homopolymer or a block copolymer.

The homopolymer may include at least one selected from poly(ethylene oxide) (PEO), poly(propylene oxide) (PPO), poly(butylene oxide), polyvinylalcohol (PVA), polyacrylonitrile (PAN), polyvinylchloride (PVC), polyacrylic acid (PAA), poly(ethyleneglycol)diacrylate (PEGDA), poly(propyleneglycol)diacrylate (PPGDA), poly(ethyleneglycol)dimethacrylate (PEGDMA), poly(propyleneglycol)dimethacrylate (PPGDMA), poly(ethyleneglycol)urethane diacrylate, poly(ethyleneglycol)urethane dimethacrylate, polyester diacrylate, polyester dimethacrylate, poly(ethyleneglycol)urethane triacrylate, poly(ethyleneglycol)urethane trimethacrylate, trimethylolpropane triacrylate, trimethylolpropane trimethacrylate, ethoxy-substituted trimethylolpropane triacrylate, propoxy-substituted trimethylolpropane triacrylate, glyceryl triacrylate, glyceryl trimethacrylate, tetramethylolpropane tetraacrylate, and di(trimethylolpropane)tetraacrylate.

The block copolymer may include at least one selected from poly(ethylene oxide)-b-poly(propylene oxide)(PEO-b-PPO), poly(ethylene oxide)-b-poly(propylene oxide)-b-poly(ethylene oxide)(PEO-b-PPO-b-PEO), poly(ethylene oxide)-b-poly(methymethacrylate)(PEO-b-PMMA), poly(methymethacrylate)-b-poly(ethylene oxide)-b-poly(methymethacrylate)(PMMA-b-PEO-b-PMMA), poly(ethylene oxide)-b-poly(styrene)(PEO-b-PS), and poly(styrene)-b-poly(ethylene oxide)-b-poly(styrene)(PS-b-PEO-b-PS).

The block copolymer may include a diblock copolymer or a triblock copolymer. For example, the block copolymer may include a linear block copolymer or a branched block copolymer. The block copolymer may have any of a variety of shapes, including a lamellar shape, a cylindrical shape, or a gyroid shape. The branched block copolymer may include any of a variety of forms of polymer, including a graft polymer, a star-shaped polymer, a comb polymer, a brush polymer, or a polymer network, but is not limited thereto, and may be any suitable polymer available as a branched copolymer in the art.

The homopolymer or block copolymer may have a weight average molecular weight ($M_w$) of about 100,000 to about 5,000,000 Daltons (Da), and in some embodiments, about 100,000 to about 4,000,000 Da, and in some other embodiments, about 100,000 to about 3,000,000 Da.

The matrix including the ionic conductive polymer may be formed by, for example, thermal polymerization or by irradiation of active rays such as ultraviolet (UV) rays.

The lithium salt of the ionically conductive polymer composition of the electrolyte membrane may include at least one selected from LiClO$_4$, LiCF$_3$SO$_3$, LiBF$_4$, LiN(CF$_3$SO$_2$)$_2$, LiPF$_6$, LiAsF$_6$, LiSbF$_6$, and LiPF$_3$(CF$_2$CF$_3$)$_3$, but is not limited thereto.

The electrolyte membrane may be formed as a flexible membrane with a reduced crystallinity due to the metal-organic framework distributed in the form of solid primary particles in the matrix including the ionically conductive polymer composition.

The crystalline characteristics of the electrolyte membrane including the metal-organic framework may be evaluated using a degree of crystallinity (DOC) of the electrolyte membrane with respect to the degree of crystallinity of an electrolyte membrane not including a metal-organic framework.

The electrolyte membrane including the metal-organic framework may have a degree of crystallinity (DOC) of about 0.50 or less, and in some embodiments, about 0.40 or less, and in some other embodiments, 0.35 or less, or 0.01 to 0.5, or 0.05 to 0.4, with respect to the degree of crystallinity of an electrolyte membrane not including a metal-organic framework.

Figure 4A:
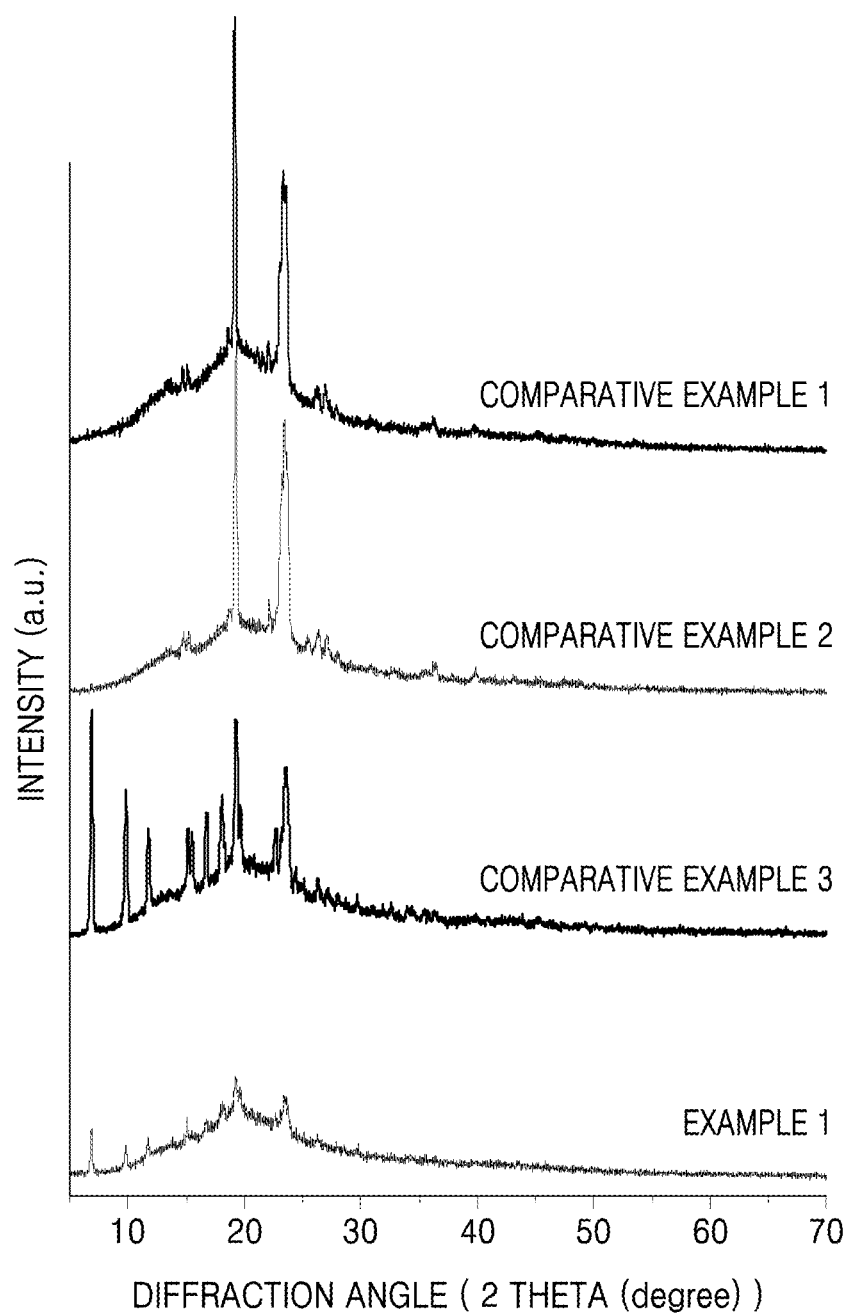
FIG. 4A is a graph of intensity (arbitrary units) versus diffraction angle (degrees two-theta, 2θ) illustrating the results of X-ray diffraction (XRD) analysis on electrolyte membranes of Example 1 and Comparative Examples 1 to 3.
Figure 4B:
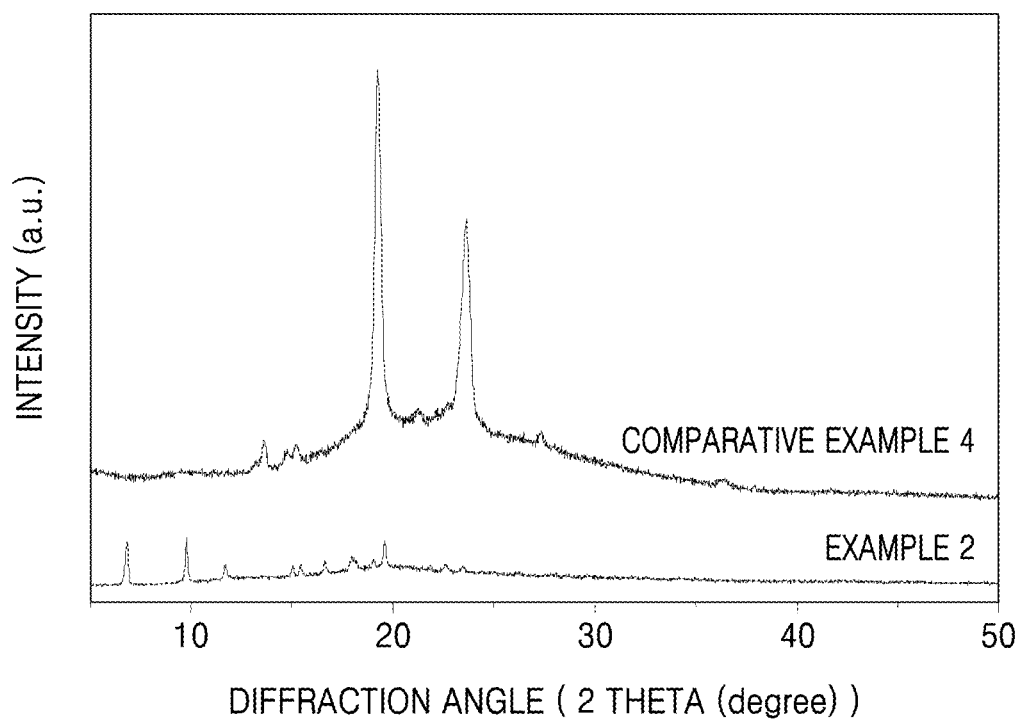
FIG. 4B is a graph of intensity (arbitrary units) versus diffraction angle (degrees two-theta, 2θ) illustrating the results of XRD analysis on electrolyte membranes of Example 2 and Comparative Example 4.

The degree of crystallinity (DOCs) of the electrolyte membrane including the metal-organic framework and an electrolyte membrane not including a metal-organic framework may be obtained from the results of X-diffraction (XRD) analysis as shown in FIGS. 4A and 4B, and in particular, from a ratio of the area of crystalline phase to a sum of the area of crystalline phase and the area of amorphous phase in the XRD analysis results. The area of crystalline phase may be obtained from a total area of two peaks indicating crystalline phase in XRD analysis data, and in particular, from a sum of the areas of a first peak ($A_{cry1}$) and a second peak ($A_{cry2}$) at a 2θ of 17° to 21° and 22° to 25°, respectively. This will be described in greater detail with reference to Evaluation Example 1.

The electrolyte membrane for an energy storage device may further include an ionic liquid. The ionic liquid may include at least one cation selected from a pyrrolidinium-based cation, a pyridinum-based cation, an imidazolium-based cation, a piperidinium-based cation, and an ammonium-based cation; and at least one anion selected from bis(trifluoromethylsulfonyl)imideanion, bromide anion, chloride anion, dicyanamide anion, hexafluorophosphate anion, phosphate anion, sulfate anion, iodide anion, sulfonate anion, nitrate anion, tetrafluoroborate anion, thiocyanate anion, and trifluoromethanesulfonate (triflate)-based anions. The ionic liquid may further improve the ionic conductivity and electrochemical stability of the electrolyte membrane.

A mole ratio of the ionic liquid to lithium ions (IL/Li) may be in a range of about 0.1 to about 2.0, and in some embodiments, about 0.2 to about 1.8, and in some other embodiments, about 0.4 to about 1.5. When the mole ratio of the ionic liquid to lithium ions (IL/Li) is within these ranges, the ionic liquid may improve the ionic conductivity of the electrolyte membrane, and provide suitable mechanical properties for suppressing growth of a lithium dendrite on the surface of the anode.

The electrolyte membrane for an energy storage device may have an ionic conductivity of about $1 \times 10^{-5}$ (S/cm) or greater, and in some embodiments, about $1.20 \times 10^{-5}$ (S/cm) or greater, and in some other embodiments, about $1.50 \times 10^{-5}$ (S/cm) or greater at room temperature.

According to another embodiment of the present disclosure, an energy storage device includes a cathode, an anode, and an electrolyte disposed between the cathode and the anode and including the electrolyte membrane. The energy storage device may further include a separator between the cathode and the anode.

The energy storage device may be, for example, a lithium battery or a supercapacitor. For example, the energy storage device may be a lithium battery.

For example, the lithium battery may be manufactured as follows.

First, a cathode of the lithium battery may be manufactured as follows.

A cathode active material, a conducting agent, a binder, and a solvent may be mixed to prepare a cathode active material composition. The cathode active material composition may be directly coated on a current collector and dried to form a cathode active material film thereon, thereby forming a cathode. Alternatively, the cathode active material composition may be cast on a separate support to form a cathode active material film, which may then be separated from the support and laminated on a current collector to form a cathode active material film thereon, thereby forming a cathode.

The cathode active material may be any suitable cathode material which is available in the art, provided that it allows for intercalation and deintercation of lithium ions. Non-limiting examples of a cathode active material that allows for intercalation and deintercalation of lithium ions includes compounds represented by the following formulas: $Li_a A_{1-b} B'_b D'_2$ (where $0.90 \leq a \leq 1.8$, and $0 \leq b \leq 0.5$); $Li_a E_{1-b} B'_b O_{2-c} D'_c$ (where $0.90 \leq a \leq 1.8$, $0 \leq b \leq 0.5$, and $0 \leq c \leq 0.05$); $LiE_{2-b} B'_b O_{4-c} D'_c$ (where $0 \leq b \leq 0.5$, and $0 \leq c \leq 0.05$); $Li_a Ni_{1-b-c} Co_b B'_c D'_\alpha$ (where $0.90 \leq a \leq 1.8$, $0 \leq b \leq 0.5$, $0 \leq c \leq 0.05$, and $0 < \alpha \leq 2$); $Li_a Ni_{1-b-c} Co_b B'_c O_{2-\alpha} F'_\alpha$ (where $0.90 \leq a \leq 1.8$, $0 \leq b \leq 0.5$, $0 \leq c \leq 0.05$, and $0 < \alpha < 2$); $Li_a Ni_{1-b-c} Co_b B'_c O_{2-\alpha} F'_2$ (where $0.90 \leq a \leq 1.8$, $0 \leq b \leq 0.5$, $0 \leq c \leq 0.05$, and $0 < \alpha < 2$); $Li_a Ni_{1-b-c} Mn_b B'_c D'_\alpha$ (where $0.90 \leq a \leq 1.8$, $0 \leq b \leq 0.5$, $0 \leq c \leq 0.05$, and $0 < \alpha \leq 2$); $Li_a Ni_{1-b-c} Mn_b B'_c O_{2-\alpha} F'_\alpha$ (where $0.90 \leq a \leq 1.8$, $0 \leq b \leq 0.5$, $0 \leq c \leq 0.05$, and $0 < \alpha < 2$); $Li_a Ni_{1-b-c} Mn_b B'_c O_{2-\alpha} F'_2$ (where $0.90 \leq a \leq 1.8$, $0 \leq b \leq 0.5$, $0 \leq c \leq 0.05$, and $0 < \alpha < 2$); $Li_a Ni_b E_c G_d O_2$ (where $0.90 \leq a \leq 1.8$, $0 \leq b \leq 0.9$, $0 \leq c \leq 0.5$, and $0.001 \leq d \leq 0.1$); $Li_a Ni_b Co_c Mn_d G_e O_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_a NiG_b O_2$ (where $0.90 \leq a \leq 1.8$, and $0.001 \leq b \leq 0.1$); $Li_a CoG_b O_2$ (where $0.90 \leq a \leq 1.8$, and $0.001 \leq b \leq 0.1$); $Li_a MnG_b O_2$ (where $0.90 \leq a \leq 1.8$, and $0.001 \leq b \leq 0.1$); $Li_a Mn_2 G_b O_4$ (where $0.90 \leq a \leq 1.8$, and $0.001 \leq b \leq 0.1$); $LiQO_2$; $LiQS_2$; $LiV_2O_5$; $LiI'O_2$; $LiNiVO_4$; $Li_{(3-f)} J_2(PO_4)_3$ (where $0 \leq f \leq 2$); $Li_{(3-f)} Fe_2(PO_4)_3$ (where $0 \leq f \leq 2$); and $LiFePO_4$.

In the formulas above,

A is at least one selected from nickel (Ni), cobalt (Co), and manganese (Mn);

B' is at least one selected from aluminum (Al), nickel (Ni), cobalt (Co), manganese (Mn), chromium (Cr), iron (Fe), magnesium (Mg), strontium (Sr), vanadium (V), and a rare earth element;

D' is at least one selected from oxygen (O), fluorine (F), sulfur (S), and phosphorus (P);

E is selected from cobalt (Co), and manganese (Mn);

F' is at least one selected from fluorine (F), sulfur (S), and phosphorus (P);

G is at least one selected from aluminum (Al), chromium (Cr), manganese (Mn), iron (Fe), magnesium (Mg), lanthanum (La), cerium (Ce), strontium (Sr), and vanadium (V);

Q is at least one selected from titanium (Ti), molybdenum (Mo), and manganese (Mn);

I' is at least one selected from chromium (Cr), vanadium (V), iron (Fe), scandium (Sc), and yttrium (Y); and J is at least one selected from vanadium (V), chromium (Cr), manganese (Mn), cobalt (Co), nickel (Ni), and copper (Cu).

Non-limiting examples of the conducting agent include carbon black, graphite particulate, natural graphite, artificial graphite, acetylene black, ketchen black, carbon fibers, metallic materials, such as copper, nickel, aluminum, silver, and the like, in powder, fiber, or tube form, and a conductive polymer such as a polyphenylene derivative. Any suitable conducting agent available in the art may be used.

Non-limiting examples of the binder include a vinylidene fluoride/hexafluoropropylene copolymer, polyvinylidene difluoride (PVDF), polyacrylonitrile, polymethylmethacrylate, polytetrafluoroethylene (PTFE), mixtures of these polymers, or a styrene butadiene rubber polymer.

For example, the binder may comprise a polysaccharide or a derivative thereof, for example, statch, methyl cellulose, carboxymethyl cellulose, hydroxymethyl cellulose, hydroxyethyl cellulose, hydroxypropyl cellulose, carboxymethyl hydroxyethyl cellulose, or nitrocellulose; phenol resin; melamine resin; polyurethane resin; urea resin; polyamide resin; polyimide resin; polyamideimide resin; petroleum pitch; or coal pitch a combination thereof. The binder may serve as a thickening agent for the cathode active material composition.

Non-limiting examples of the solvent are N-methyl-pyrrolidone (NMP), acetone, and water. Any suitable material available as a solvent in the art may be used.

The current collector of the cathode may include a metal, for example, nickel, aluminum, titanium, copper, gold, silver, platinum, an aluminum aHoy, or stainless steel, or may be formed by plasma spraying or arc spraying, for example, a carbonaceous material, activated carbon fiber, nickel, aluminum, zinc, copper, tin, lead, or an alloy thereof. The current collector may be a conductive film formed by dispersing a conductive agent in resin such as a rubber or styrene-ethylene-butylene-styrene (SEBS) copolymer. For example, the current collector may include aluminum, nickel, or stainless steel. The current collector may be formed of aluminum that is easily processable into a thin film and costs low. The current collector may have any of a variety shapes, for example, a thin film shape, a flat-plate shape, a mesh shape, a net shape, a punched shape, an embossed shape, or a combination thereof (for example, a meshed flat-plate shape). For example, the current collector may have an uneven surface through etching.

The amounts of the cathode active material, the conducting agent, the binder, and the solvent used in the manufacture of the lithium battery are those levels that are generally used in the art. At least one of the conducting agent, the binder, and the solvent may not be used depending on the use and the structure of the lithium battery. Alternatively, a plasticizer may be further added to the cathode active material composition to form a cathode plate including pores.

An anode of the lithium battery may be manufactured in the same manner as in the manufacturing of the cathode, except for using an anode active material, instead of the cathode active material.

The anode may be manufactured as follows.

Next, similarly to the manufacturing of the cathode as described above, an anode active material, a conducting agent, a binder, and a solvent may be mixed together to prepare an anode active material composition. The anode active material composition may be directly coated on a current collector to form the anode. In some embodiments, the anode active material composition may be cast on a separate support to form an anode active material film, which may then be separated from the support and laminated on a current collector to manufacture the anode.

Examples of the anode active material include lithium metal, a metal that is alloyable with lithium, a transition metal oxide, a material that allows doping or undoping of lithium, a material that allows reversible intercalation and deintercalation of lithium ions, and the like.

For example, the metal that is alloyable with lithium may be at least one metal selected from Na, K, Rb, Cs, Fr, Be, Mg, Ca, Sr, Ba, Ra, Al, and Sn.

The anode including a lithium metal or an alloy thereof may have a thickness of about 50 nm to about 100 µm, and in some embodiments, about 100 nm to about 1 µm, and in some other embodiments, about 200 nm to about 500 nm. For example, the anode may have a thickness of less than 500 nm, and in some embodiments, less than 200 nm, and in some other embodiments, less than 100 nm, and in some other embodiments, less than 50 nm.

Examples of the transition metal oxide include vanadium oxide, lithium vanadium oxide, and the like. Examples of the material that allows doping or undoping of lithium include silicon (Si), $SiO_x$ wherein $0<x<2$, an Si—Y' alloy wherein Y' is an alkali metal, an alkaline earth metal, a Group 13 to Group 16 element, a transition metal, a rare earth element, or a combinations thereof (except for Si), Sn, $SnO_2$, an Sn—Y' alloy (where Y' is an alkali metal, an alkaline earth metal, a Group 13 to 16 element, a transition metal, a rare earth element, or a combination thereof, except for Sn), and combinations of at least one of these materials and $SiO_2$. Y' may be at least one selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), and polonium (Po).

The material that allows reversible intercalation and deintercalation of lithium ions may be any suitable carbonaceous anode active material that is used in lithium ion secondary batteries. Examples of this material include crystalline carbon, amorphous carbon, and combinations thereof. Examples of the crystalline carbon include graphite, such as natural graphite or artificial graphite that are in a plate, flake, spherical or fibrous form. Examples of the amorphous carbon include soft carbon (carbon sintered at low temperatures), hard carbon, meso-phase pitch carbides, and sintered corks.

However, the anode active material is not limited to the above-listed materials, and any suitable anode active material known in the art that may be used for an anode that allow for intercalation or deintercalation of lithium ions may be used.

The current collector of the anode may be any suitable corrent collector, not limited to a material, shape, or manufacturing method thereof. For example, the current collector of the anode may include, a copper foil having a thickness of about 10 µm to about 100 µm, a punched copper foil having a thickness of about 10 µm to about 100 µm and a hole diameter of about 0.1 mm to about 10 mm, expandable metal, a foamed metal plate, or the like. The current collector of the anode may comprise copper, stainless steel, titanium, nickel, or the like.

The conducting agent, the binder, and the solvent in the anode active material composition may be the same as those used in the cathode active material composition. If desired, a plasticizer may be added to the anode active material composition to form an anode plate including pores.

The amounts of the anode active material, the conducting agent, the binder, and the solvent used in the manufacture of the lithium battery may be amounts that are used in the art, the details of which may be determined by one of skill in the art without undue experimentation. At least one of the conducting agent, the binder and the solvent may not be used depending on the use and the structure of the lithium battery.

Next, an electrolyte of the lithium battery is prepared.

Figure 7A:
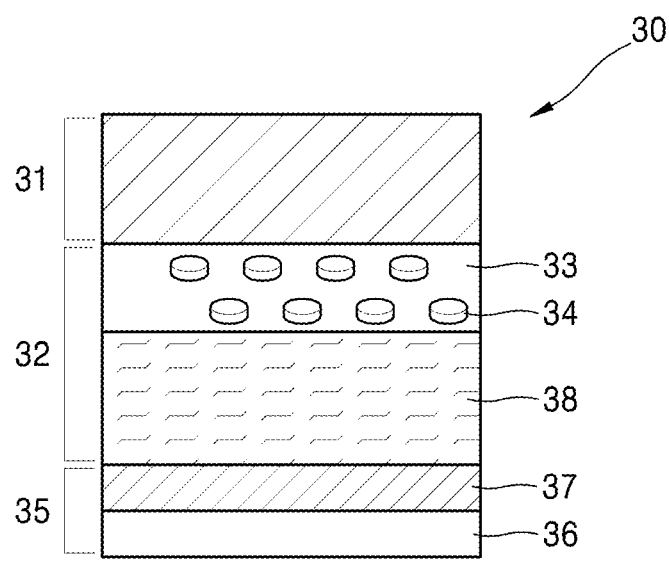
FIG. 7A is a schematic diagram of an embodiment of a lithium battery.

The electrolyte may include the electrolyte membrane disclosed herein. The electrolyte membrane may be disposed on at least a region of the anode. Referring to FIG. 7A, which is a schematic view of a lithium battery 30 according to an embodiment of the present disclosure, an electrolyte membrane 32 of the lithium battery 30 is disposed on a surface of an anode 31.

In some embodiments, the electrolyte of the lithium battery may further include an organic solvent that is stable against lithium metal, in addition to the electrolyte membrane 32. The organic solvent may be include at least one selected from propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, ethyl propyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethylacetamide, dimethyl sulfoxide, dioxane, 1,2-dimethoxyethane, sulforane, dichloroethane, chlorobenzene, nitrobenzene, and diethylene glycol.

The electrolyte membrane 32 may be disposed as a separate membrane between the the cathode and the anode.

The electrolyte membrane 32 may have a monolayered structure or a multilayered structure including at least two layers.

Figure 7B:
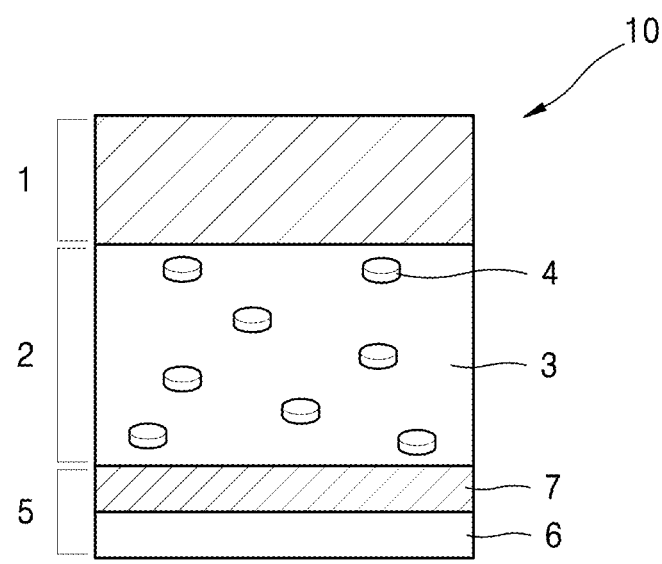
FIG. 7B is a schematic diagram of another embodiment of a lithium battery.
Figure 7C:
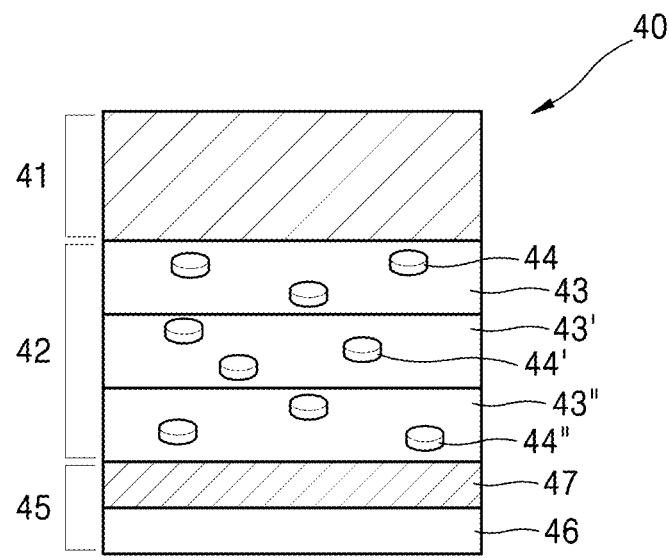
FIG. 7C is a schematic diagram of another embodiment of a lithium battery.

FIG. 7B is a schematic view of a lithium battery 10 according to another embodiment of the present disclosure. FIG. 7C is a schematic view of a lithium battery 40 according to another embodiment of the present disclosure. Referring to FIG. 7B, in the lithium battery 10, an electrolyte membrane 2 including an ionically conductive polymer composition-including matrix 3, a metal-organic framework 4, and a lithium salt (not shown) may be disposed between an anode 1, and a cathode 5. The cathode 5 is disposed on a current collector 6 and includes a cathode active material 7. Referring to FIG. 7C, in the lithium battery 40, an electrolyte membrane 42 includes first, second, and third ionically conductive polymer composition-including matrices 43, 43', and 43", respectively, first, second and third metal-organic frameworks 44, 44', and 44", respectively, and a lithium salt (not shown) may be disposed between an anode 41, and a cathode 45. The cathode 45 is disposed on a current collector 46 and includes a cathode active material 47. The first, second, and third ionically conductive polymer composition-including matrices 43, 43', and 43" are independently selected, and may be the same or different. The first, second and third metal-organic frameworks 44, 44', and 44" are independently selected, and may be the same or different.

In some embodiments, the electrolyte membrane may have a thickness of about 0.01 µm to about 100 µm, and in some embodiments, about 0.01 µm to about 90 µm, and in some other embodiments, about 0.01 µm to about 80 µm, and in some other embodiments, about 0.01 µm to about 70 µm, and in some other embodiments, about 0.01 µm to about 60 µm, and in still some other embodiments, about 0.01 µm to about 50 µm.

A separator (not shown) may be disposed between the cathode and the anode, if desired. The separator may be any suitable separator that is used in lithium batteries. The separator may have low resistance against migration of ions in an electrolyte and have a good electrolyte-retaining ability. Examples of the separator include glass fiber, polyester, Teflon, polyethylene, polypropylene, polytetrafluoroethylene (PTFE), and a combination thereof, each of which may be a non-woven or woven fabric. For example, a windable separator including polyethylene or polypropylene may be used for a lithium ion battery. A separator with good ability to retain an electrolyte, for example, an organic electrolyte, may be used for a lithium ion polymer battery.

For example, the separator may be manufactured in the following manner.

A polymer resin, a filler, and a solvent may be mixed together to prepare a separator composition. Then, the separator composition may be directly coated on an anode, and then dried to form the separator. Alternatively, the separator composition may be cast on a support and then dried to form a separator film, which may then be separated from the support and laminated on the anode to form the separator.

The polymer resin used for manufacturing the separator may be any suitable material that is used as a binder for electrodes. Examples of the polymer resin include a vinylidenefluoride/hexafluoropropylene copolymer, polyvinylidene fluoride (PVDF), polyacrylonitrile, polymethylmethacrylate and a mixture thereof.

In some embodiments, the lithium battery may be a lithium metal battery. The lithium metal battery may be the same as the above-described lithium battery in terms of structure and manufacturing method thereof, except that a lithium metal or a lithium metal alloy is used as the anode of the lithium metal battery, and thus detailed description of the lithium metal battery will be omitted herein.

The lithium battery may be stable at up to a voltage of about 5 V or greater, for example, about 5.1 V, or 5 V to 5.2V, with respect to Li$^+$/Li. Lithium batteries may be a cylindrical type, rectangular type, coin type, or pouch type according to the shape thereof. Lithium batteries may also be classified as either bulk type or thin film type according to the size thereof. Lithium batteries may be used either as primary lithium batteries or secondary lithium batteries. Methods of manufacturing these lithium batteries are widely known in the art, so a detailed description thereof will not be recited here.

In some embodiments, the energy storage device may be a supercapacitor.

Figure 8:
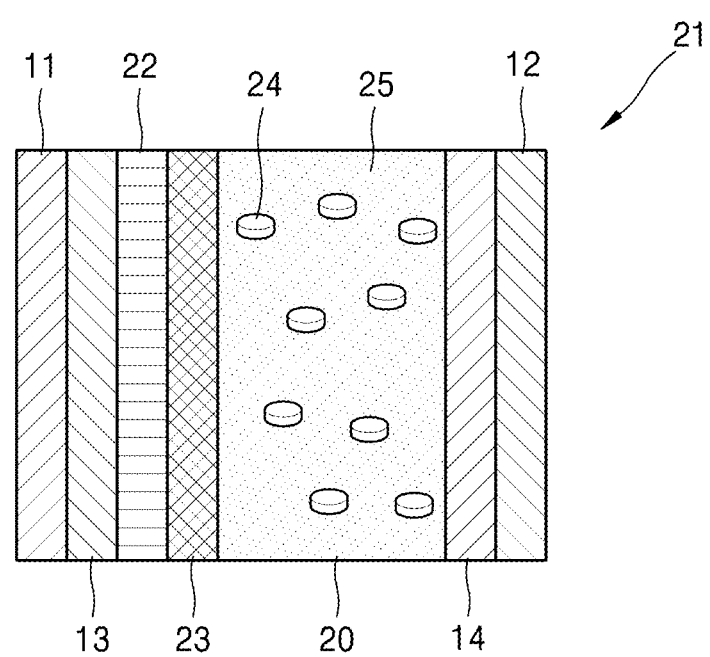
FIG. 8 is a schematic diagram of an embodiment of a supercapacitor.

FIG. 8 is a schematic view of a supercapacitor 21 according to an embodiment of the present disclosure.

Referring to FIG. 8, the supercapacitor 21 may include a first current collector 11, a second current collector 12, a first electrode 13 bound to the first current collector 11, a second electrode 14 bound to the second current collector 12, an ion carrier 22 disposed between the first electrode 13 and the second electrode 14, a support layer 23 bound to the ion carrier 22 to support the same between the first electrode 13 and the support layer 23, and an electrolyte membrane 20 disposed between the second electrode 14 and the support layer 23 bound to the ion carrier 22.

The first electrode 13 and the second electrode 14 may be a cathode and an anode, respectively, or may be an anode and a cathode, respectively. The first electrode 13 or the second electrode 14 may have any suitable shape, for example, a sheet-like shape, a block shape, or a cylindrical shape. The first electrode 13 and the second electrode 14 may be disposed in any of a variety of configurations. For example, the first electrode 13 and the second electrode 14 may be concentrically disposed to each other with a continuous spiral space therebetween.

The first electrode 13 or the second electrode 14 may include a conductive material, for example, carbon or a carbonaceous material. The carbonaceous material may include, for example, activated carbon particles, porous carbon particles, carbon fiber, or a combination thereof. The conductive material may include, for example, manganese oxide, iron oxide, manganese iron oxide, titanium carbide, zirconium carbide, vanadium carbide, tungsten carbide, or a combination thereof. The conductive material may be case on the first current collector 11 and the second current collector 12 by sputtering, spin coating, print coating, or the like.

The first current collector 11 and the second current collector 12 may be formed of a metal or an alloy thereof in the form of a plate, mesh, foil, or sheet. The metal may include, for example, titanium, platinum, iridium, or rhodium. The alloy may include, for example, stainless steel. The first current collector 11 and the second current collector 12 may be formed of graphite or a plastic material, such as polyolefin including polyethylene. These materials for the first current collector 11 and the second current collector 12 may be mixed with conductive carbon black or metal particles to increase the conductivity thereof, if desired.

The ion carrier 22 may facilitate migration of anions and cations of the electrolyte membrane 20. For example, the ion carrier 22 may be an ionic polymer, such as polyamphoteric electrolyte including polyphosphate or polysilicate. The ion carrier 22 may be used for either only anion exchange or only cation exchange to accelerate adsorption of specific ion species such as ion impurities in liquid. The ion carrier 22 may be in the form of gel or solution. The support layer 23 may be a spacer (not shown) for separating the second electrode 14 from the first electrode 13. The electrolyte membrane 20 may be any of the electrolyte membranes according to the above-described embodiments, including an ionic conductive polymer composition-including matrix 25, a lithium salt (not shown), and a metal-organic framework 24. The metal-organic framework 24 may be distributed in the form of a plurality of primary particles in the matrix 25, wherein the plurality of primary particles may have a uniform particle diameter distribution represented by Inequation 1.

In some embodiments, a separator (not shown) as described above may be disposed between the first electrode 13 and the second electrode 14, if desired.

Embodiments of the present disclosure are not limited to the supercapacitor of FIG. 8, and may include any supercapacitors having any shape or any structure available in the art.

According to another embodiment of the present disclosure, a method of preparing an electrolyte membrane for an energy storage device includes:
contacting, e.g., adding, an metal ion precursor, an organic ligand precursor, and a solvent to prepare a metal-organic framework (MOF);
contacting, e.g., adding, a matrix including an ionic conductive polymer composition comprising a polymer and a lithium salt to a solvent to obtain a mixture; and
contacting, e.g., adding, the metal-organic framework to the mixture to form a composition; and disposing the composition, e.g., coating the composition, on a substrate to form an electrolyte membrane according to any of the above-described embodiments.

The preparing of the metal-organic framework may be performed by a hydrothermal synthesis method, a microwave synthesis method, an ultrasonic synthesis method, an electrochemical synthesis method, or a mechanical chemical synthesis method.

A mole ratio of the organic ligand precursor to the metal ion precursor may be greater than a stoichiometric mole ratio thereof. For example, a mole ratio of the organic ligand precursor to the metal ion precursor may be greater than a stoichiometric mole ratio thereof by about greater than 1 to about 50 times, and in some embodiments, by about greater than 1 to about 30 times, and in some other embodiments, by about greater than 1 to about 20 times.

When a mole ratio of the organic ligand precursor to the metal ion precursor is greater than a stoichiometric mole ratio thereof, a metal-organic framework can include a plurality of nanoparticles having a uniform diameter and may be effectively distributed in the ionic conductive polymer composition-including matrix, and thus may improve the mechanical properties of the electrolyte membrane and lower the crystallinity of the matrix, so an electrolyte membrane for an energy storage device having an improved ionic conductivity at room temperature and improved electrochemical stability may be obtained. While not wanting to be bound by theory, it is understood that this is attributed to that nucleation of metal ions serving as nuclei is more likely to occur at an energy level where nucleation is able to occur during formation of the metal-organic framework, and consequentially the plurality of primary particles may grow at the same rate to a uniform size.

The solvent in the preparing of the metal-organic framework may include water, methanol, ethanol, propanol, isopropanol, dimethylformamide, dimethylsulfoxide, tetrahydrofuran, or ionic liquid. The solvent may be a mixture of these solvents.

The preparing of the metal-organic framework may include thermally treating reactor in an oven at a temprature of about 50° C. to about 500° C. for about 1 hour to 24 hours, and in some embodiments, at a temperature of about 150° C. or higher for about 15 hours to 24 hours.

The preparing of the metal-organic framework may further include drying in a vacuum oven at a tempature of about 50° C. to about 80° C. for about 12 hours to about 24 hours, and in some embodiments, at a temperature of about 50° C. to about 70° C. for about 15 hours to about 24 hours.

The preparing of the metal-organic framework may further include a post-treatment process performed in an apparatus able to supply heat energy under vacuum, air, or inert gas atmosphere conditions at a temperature of about 100° C. to about 1200° C. for about 10 minutes to about 24 hours. In some embodiments, the preparing of the metal-organic framework may further include drying in an electric furnace under air atmosphere at a temperature of about 200° C. to about 400° C. for about 3 hours to about 6 hours.

Next, the matrix including an ionic conductive polymer composition comprising the polymer and a lithium salt may be added to a solvent to obtain a mixture. This mixture may be a homogenized colloid solution.

After adding the metal-organic framework to the mixture, the resulting mixture may be coated on a substrate to form an electrolyte membrane according to any of the above-described embodiments. The coating of the resulting mixture on the substrate may be performed using any coating method available in the art, for example, spin coating, dip coating, solution casting, spray coating, or doctor blade coating. For example, the coating of the resulting mixture on the substrate may be performed using doctor blade coating. The coating may be followed by thermal treatment under vacuum at a temperature of about 25° C. to about 150° C. for about 1 hour to about 72 hours, thereby forming the electrolyte membrane.

Hereinafter, one or more embodiments will be described in further detail with reference to the following examples. These examples are not intended to limit the purpose and scope of the one or more embodiments.

EXAMPLES

Preparation Example 1

Preparation of Metal-organic Framework (MIL-125 ($Ti_8O_8(OH)_4(BDC)_6$), H2BDC=1,4-benzenedicarboxylate)

Titanium isopropoxide (99.8%, available from Signal Aldrich as a metal ion precursor and 1,4-benzenedicarboxylic acid ($H_2BDC$, 99%, available from Aldrich) as an organic ligand precursor were added to 50 mL of a mixed solvent (9:1, v/v) of N,N-dimethylformamide (DMF, available from Aldrich) and methanol to have a final reaction mole ratio of about 1:14.85 of 1,4-benzenedicarboxylic acid to titanium isopropoxide that is higher than a stoichiometric mole ratio of 1:0.75 thereof.

The resulting mixture was put in a reactor, which was then thermally treated in an oven at about 150° C. for about 24 hours, followed by cooling down to room temerapture, and washing the remaining unreacted organic ligand with N,N-dimethylformamide and then with methanol, each three times, and filtering to obtain a precipitate as white solid powder. The precipitate was dried in an oven at 60° C. under vaccum for about 24 hours, thereby preparing a metal-organic framework (MIL-125 ($Ti_8O_8(OH)_4(BDC)_6$)).

Preparation Example 2

Preparation of Metal-organic Framework (MIL-53 ($Al(OH)(O_2C$—$C_6H_4$—$CO_2$))

Aluminum nitrate nonahydrate, 98%, available from Sigma Aldrich) as a metal ion precursor and 1,4-benzenedicarboxylic acid ($H_2BDC$, 99%, available from Sigma Aldrich) as an organic ligand precursor were added to 50 mL of N,N-dimethylformamide (DMF, available from Sigma Aldrich) to have a final reaction mole ratio of about 1:2 of 1,4-benzenedicarboxylic acid to aluminum nitrate nonahydrate that is higher than a stoichiometric mole ratio of 1:1 thereof.

The resulting mixture was put in a reactor, which was then thermally treated in an oven at about 150° C. for about 24 hours, followed by cooling down to room temerapture, and washing the remaining unreacted organic ligand with N,N-dimethylformamide and then with methanol, each three times, and filtering to obtain a precipitate as white solid powder. The precipitate was dried in an oven at 60° C. under vaccum for about 24 hours, thereby preparing a metal-organic framework (MIL-53 ($Al(OH)(O_2C$—$C_6H_4$—$CO_2$)).

Comparative Preparation Example 1

Preparation of Metal-organic Framework (MIL-125 ($Ti_8O_8(OH)_4(BDC)_6$), BDC=1,4-benzenedicarboxylate)

Titanium isopropoxide (99.8%, available from Sigma Aldrich) as a metal ion precursor and 1,4-benzenedicarboxylic acid ($H_2BDC$, 99%, available from Sigma Aldrich) as an organic ligand precursor were added to 50 mL of a mixed solvent (9:1, v/v) of N, N-dimethylformamide (DMF, available from Sigma Aldrich) and methanol to have a final reaction mole ratio of about 1:0.75 of 1,4-benzenedicarboxylic acid to titanium isopropoxide that is equal to a stoichiometric mole ratio thereof.

The resulting mixture was put in a reactor, which was then thermally treated in an oven at about 150° C. for about 24 hours, followed by cooling down to room temerapture, and washing the remaining unreacted organic ligand with N,N-dimethylformamide and then with methanol, each three times, and filtering to obtain a precipitate as white solid powder. The precipitate was dried in an oven at 60° C. under vaccum for about 24 hours, thereby preparing a metal-organic framework (MIL-125 ($Ti_8O_8(OH)_4(BDC)_6$)).

Example 1

Electrolyte Membrane (MIL-125 Membrane ($Ti_8O_8(OH)_4(BDC)_6$), BDC=1,4-benzenedicarboxylate)

Poly(ethylene oxide) (PEO, Mw=600k, 99.9%, available from Sigma Aldrich) was dissolved in 5 wt % of anhydrous tetrahydrofuran (THF, ≥99%, available from Sigma Aldrich), followed by adding lithium bis(trifluoromethanesulfonyl)imide ($LiN(SO_2CF_3)_2$, LiTFSI, available from PANAX Ltd.) to the solution to a 16:1 mole ratio of ethylene oxide to lithium ions (EO/Li).

3 wt % of the metal-organic framework (MIL-125 ($Ti_8O_8(OH)_4(BDC)_6$)) of Preparation Example 1 was added to the PEO-LiTFSI-THF mixed solution and stirred at about 250 rpm/min in an argon atmosphere for about 12 hours to obtain a homogenized colloid solution. This colloid solution was coated on a Teflon support substrate with a doctor plate (1 mm) and dried at about 60° C. under vacuum for about 12 hours, thereby manufacturing an electrolyte membrane. The electrolyte membrane had a thickness of about 50 μm.

Example 2

Preparation of Electrolyte Membrane (MIL-125 Membrane ($Ti_8O_8(OH)_4(BDC)_6$), BDC=1,4-benzenedicarboxylate)

A polystyrene-b-poly(ethylene oxide)-b-polystyrene(PS-b-PEO-b-PS) block copolymer (10-36-10 kg/mol, Mw (Mn)=56,000 daltons, available from Polymer Source) was dissolved in 5 wt % of anhydrous tetrahydrofuran (THF, ≥99%, available from Sigma Aldrich), followed by adding lithium bis(trifluoromethanesulfonyl)imide ($LiN(SO_2CF_3)_2$, LiTFSI, available from PANAX Ltd.) to the solution to a 20:1 mole ratio of ethylene oxide to lithium ions (EO/Li).

3 wt % of the metal-organic framework (MIL-125 ($Ti_8O_8(OH)_4(BDC)_6$)) of Preparation Example 1 was added to the PS-b-PEO-b-PS-LiTFSI-THF mixed solution and stirred at about 250 rpm/min in an argon atmosphere for about 12 hours to obtain a homogenized colloid solution. This colloid solution was coated on a Teflon support substrate with a doctor plate (1 mm) and dried at about 60° C. under vacuum for about 12 hours, thereby manufacturing an electrolyte membrane. The electrolyte membrane had a thickness of about 50 μm.

Example 3

Preparation of Electrolyte Membrane (MIL-125 Membrane ($Ti_8O_8(OH)_4(BDC)_6$), BDC=1,4-benzenedicarboxylate)

Poly(ethylene oxide) (PEO, Mw=600 k, 99.9%, available from Sigma Aldrich) was dissolved in 5 wt % of anhydrous tetrahydrofuran (THF, ≥99%, available from Sigma Aldrich), followed by adding lithium bis(trifluoromethanesulfonyl)imide ($LiN(SO_2CF_3)_2$, LiTFSI, available from PANAX Ltd.) to the solution to a 16:1 mole ratio of ethylene oxide to lithium ions (EO/Li).

N-butyl-N31methylpyrrolidinium bis(3-trifluoromethanesulfonyl)imide ($PYR_{14}TFSI$, ≥98% HLPC grade, Mw (Mn)=422.41 daltons, available from C-TRI) was added to the lithium salt-containing solution to a 0.1:1 mole ratio of ionic liquid to lithium ions (IL/Li).

3 wt % of the metal-organic framework (MIL-125 ($Ti_8O_8(OH)_4(BDC)_6$)) of Preparation Example 1 was added to the PEO-LiTFSI-$PYR_{14}$TFSI-THF mixed solution and stirred at about 250 rpm/min in an argon atmosphere for about 12 hours to obtain a homogenized colloid solution. This colloid solution was coated on a Teflon support substrate with a doctor plate (1 mm) and dried at about 60° C. under vacuum for about 12 hours, thereby manufacturing an electrolyte membrane. The electrolyte membrane had a thickness of about 50 μm.

Comparative Example 1

Manufacture of Electrolyte Membrane

Poly(ethylene oxide) (PEO, Mw=600 k, 99.9%, available from Sigma Aldrich) was dissolved in 5 wt % of anhydrous tetrahydrofuran (THF, ≥99%, available from Sigma Aldrich), followed by adding lithium bis(trifluoromethanesulfonyl)imide (LiN($SO_2CF_3$)$_2$, LiTFSI, available from PANAX Ltd.) to the solution to a 16:1 mole ratio of ethylene oxide to lithium ions (EO/Li).

The resulting solution was coated on a Teflon support substrate with a doctor plate (1 mm) and dried at about 60° C. under vacuum for about 12 hours, thereby manufacturing an electrolyte membrane. The electrolyte membrane had a thickness of about 50 μm.

Comparative Example 2

Manufacture of Electrolyte Membrane

Poly(ethylene oxide) (PEO, Mw=600 k, 99.9%, available from Sigma Aldrich) was dissolved in 5 wt % of anhydrous tetrahydrofuran (THF, ≥99%, available from Sigma Aldrich), followed by adding lithium bis(trifluoromethanesulfonyl)imide (LiN($SO_2CF_3$)$_2$, LiTFSI, available from PANAX Ltd.) to the solution to a 16:1 mole ratio of ethylene oxide to lithium ions (EO/Li).

3 wt % of $TiO_2$ having an average particle diameter of about 30 nm was added to the PEO-LiTFSI-THF mixed solution and stirred at about 250 rpm/min in an argon atmosphere for about 12 hours to obtain a homogenized colloid solution. This colloid solution was coated on a Teflon support substrate with a doctor plate (1 mm) and dried at about 60° C. under vacuum for about 12 hours, thereby manufacturing an electrolyte membrane. The electrolyte membrane had a thickness of about 50 μm.

Comparative Example 3

Manufacture of Electrolyte Membrane

Poly(ethylene oxide) (PEO, Mw=600 k, 99.9%, available from Sigma Aldrich) was dissolved in 5 wt % of anhydrous tetrahydrofuran (THF, ≥99%, available from Sigma Aldrich), followed by adding lithium bis(trifluoromethanesulfonyl)imide (LiN($SO_2CF_3$)$_2$, LiTFSI, available from PANAX Ltd.) to the solution to a 16:1 mole ratio of ethylene oxide to lithium ions (EO/Li).

3 wt % of the metal-organic framework (MIL-125 ($Ti_8O_8$(OH)$_4$(BDC)$_6$)) of Comparative Preparation Example 1 was added to the PEO-LiTFSI-THF mixed solution and stirred at about 250 rpm/min in an argon atmosphere for about 12 hours to obtain a homogenized colloid solution. This colloid solution was coated on a Teflon support substrate with a doctor plate (1 mm) and dried at about 60° C. under vacuum for about 12 hours, thereby manufacturing an electrolyte membrane. The electrolyte membrane had a thickness of about 50 μm.

Comparative Example 4

Manufacture of Electrolyte Membrane

A polystyrene-b-poly(ethylene oxide)-b-polystyrene(PS-b-PEO-b-PS) block copolymer (10-36-10 kg/mol, Mw (Mn) =56,000 daltons, available from Polymer Source) was dissolved in 5 wt % of anhydrous tetrahydrofuran (THF, ≥99%, available from Sigma Aldrich), followed by adding lithium bis(trifluoromethanesulfonyl)imide (LiN($SO_2CF_3$)$_2$, LiTFSI, available from PANAX Ltd.) to the solution to a 20:1 mole ratio of ethylene oxide to lithium ions (EO/Li).

The resulting solution was coated on a Teflon support substrate with a doctor plate (1 mm) and dried at about 60° C. under vacuum for about 12 hours, thereby manufacturing an electrolyte membrane. The electrolyte membrane had a thickness of about 50 μm.

Analysis Example 1

Electroscanning Microscopy (SEM)

The metal-organic frameworks of Preparation Example 1 and Comparative Preparation Example 1 were observed by scanning electron microscopy (SEM) using a Mini-SEM SNE-3000MB (available from SEC Co., Ltd.). The results thereof are shown in FIGS. 1A and 1B, respectively.

Figure 1B:
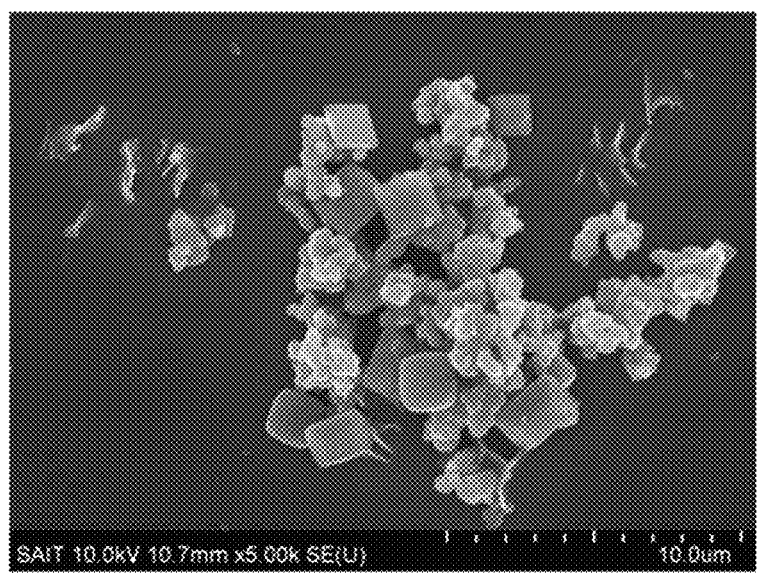
FIG. 1B is a SEM image of a metal-organic framework (MIL-125 ($Ti_8O_8(OH)_4(BDC)_6$, wherein BDC is 1,4-benzenedicarboxylate) of Comparative Preparation Example 1.

Referring to FIG. 1A, the metal-organic framework of Preparation Example 1 was found to include a plurality of primary particles having a uniform spherical shape and a uniform diameter of about 400 nm. Referring to FIG. 1B, the metal-organic framework of Comparative Preparation Example 1 was found to include a plurality of primary particles in various forms, for example, a rectangular, elliptical, dumbbell, or thin-film shape and having a diameter or size of about 10 nm to 2 μm or larger, and a plurality of secondary particles agglomerated from the primary particles.

Analysis Example 2

Analysis of Diameter Distribution of Primary Particles of Metal-organic Framework Particle diameter distributions of the metal-organic frameworks of Preparation Examples 1 and 2 and Comparative Preparation Example 1 were observed using dynamic laser scattering (DLS) using a Horiba LA-950 (available from Horiba Scientific). The results are shown in Table 1 and FIGS. 2A to 2C.

TABLE 1

| Example | Average particle diameter (μ)(μm) | Standard deviation (σ) | F (σ²/μ) |
|---|---|---|---|
| Preparation Example 1 | 0.3914 | 0.2423 | 0.619 |
| Preparation Example 2 | 0.12634 | 0.29181 | 0.673 |
| Comparative Preparation Example 1 | 3.0763 | 2.2282 | 1.613 |

In Table 1, F ($\sigma^2/\mu$) is a factor indicating the particle diameter distribution of primary particles of metal-organic framework, and $\sigma^2$, which indicates a diameter variance for the primary particles of the metal-organic framework, is equivalent to a square of a standard deviation of average particle diameter of the primary particles of the metal-organic framework, and μ indicates an average particle diameter of the plurality of primary particles of the metal-organic framework.

Figure 2A:
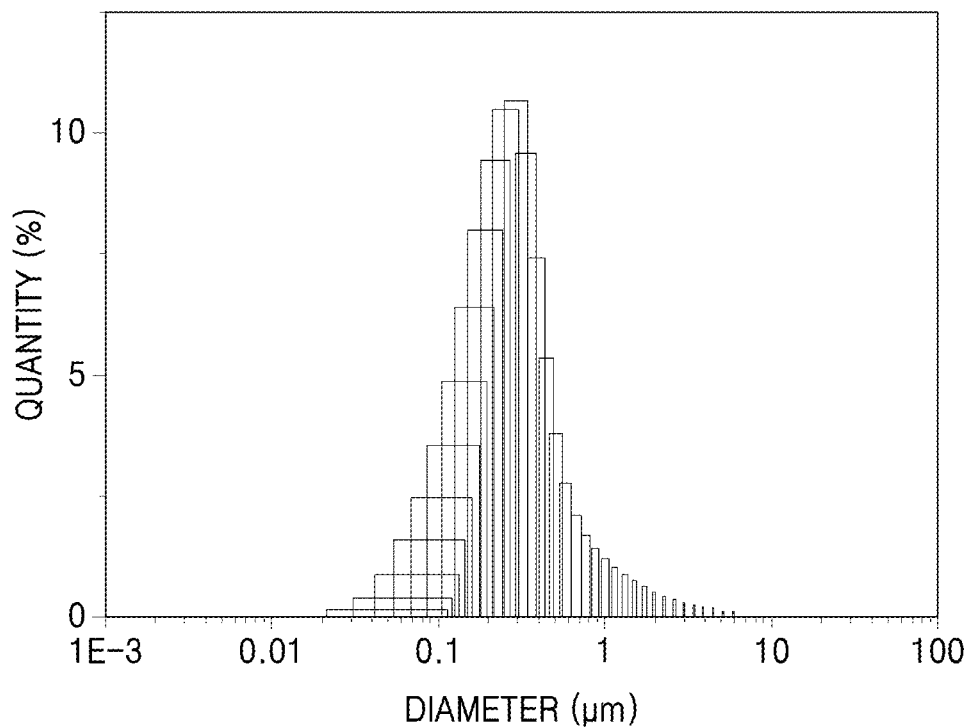
FIG. 2A is a graph of quantity (percent) versus diameter (micrometers, μm) showing particle diameter distribution of primary particles in the metal-organic framwork of Preparation Example 1, obtained using dynamic laser scattering (DLS)
Figure 2B:
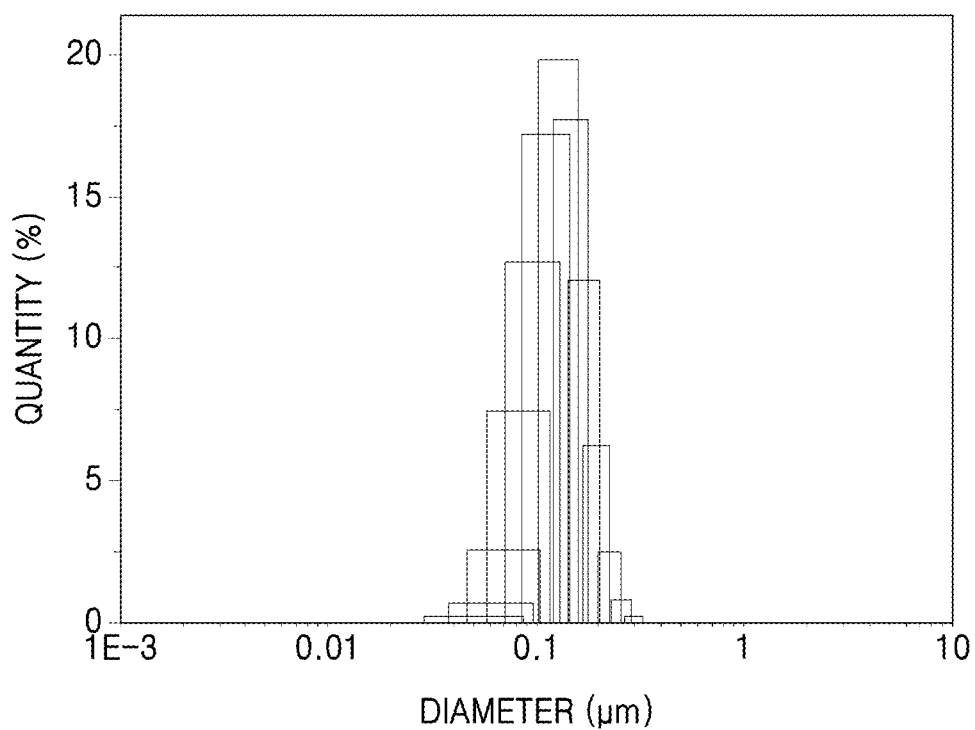
FIG. 2B is a graph of quantity (percent) versus diameter (micrometers, μm) showing particle diameter distribution of primary particles in a metal-organic framwork of Preparation Example 2, obtained using DLS.
Figure 2C:
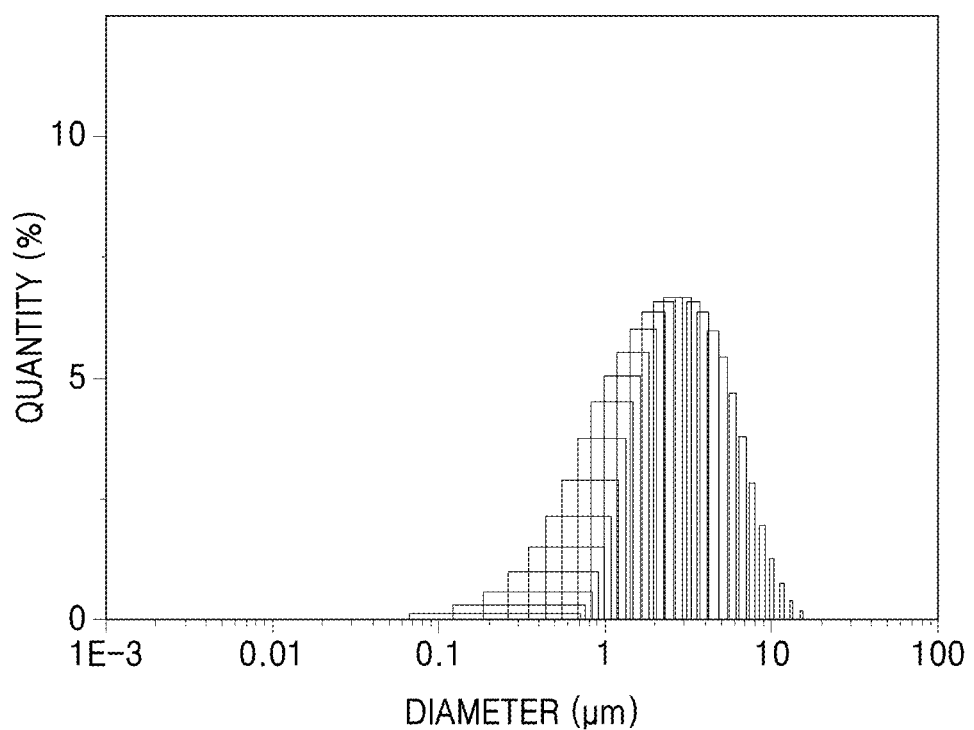
FIG. 2C is a graph of quantity (percent) versus diameter (micrometers, μm) showing particle diameter distribution of primary particles in the metal-organic framwork of Comparative Preparation Example 1, obtained using DLS.

Referring to Table 1 and FIGS. 2A to 2C, the factors F of the metal-organic frameworks of Preparation Example 1 and Preparation Example 2, which indicate the particle diameter distribution of the primary particles of the metal-organic framework, were found to be 0.619 and 0.673, respectively, both less than 1.0 Meanwhile, the factor F of the metal-organic framework of Comparative Preparation Example 1, which indicate the particle diameter distribution of the primary particles of the metal-organic framework, was found to be 1.613, which is above 1.0.

These results indicate that the primary particles of the metal-organic frameworks of Preparation Example 1 and Preparation Example 2 may have a uniform particle diameter near to the average particle diameter thereof, compared to the primary particles of the metal-organic framework of the metal-organic framework of Comparative Preparation Example 1.

Analysis Example 3

Analysis of Pore Characteristics ($N_2$ Adsorption-desorption Isotherm)

The metal-organic framework of Preparation Example 1 was subjected to degassing under a vacuum condition at about 150° C. for about 24 hours, followed by a nitrogen ($N_2$) adsorption/desorption test. In the nitrogen adsorption/desorption test, after nitrogen gas was adsorbed onto the metal-organic framework in powder form and then desorbed therefrom, a difference between the adsorption and desorption amounts of nitrogen was obtained to calculate a specific surface area and a pore volume of the metal-organic framework. A pore size distribution of the metal-organic framework was also obtained and an average pore size was calculated therefrom. A nitrogen adsorption/desorption apparatus used was a BELSORP-max (available from BEL INC.).

In particular, $N_2$ adsorption-desorption isotherms were obtained from the nitrogen adsorption/desorption test to calculate a specific surface area of pores of the metal-organic framework at a relative nitrogen pressure ($P/P_0$) of about 0 to about 1.0 by the Brunauer-Emmett-Teller (BET) method. The results are obtained from FIG. 3.

Figure 3:
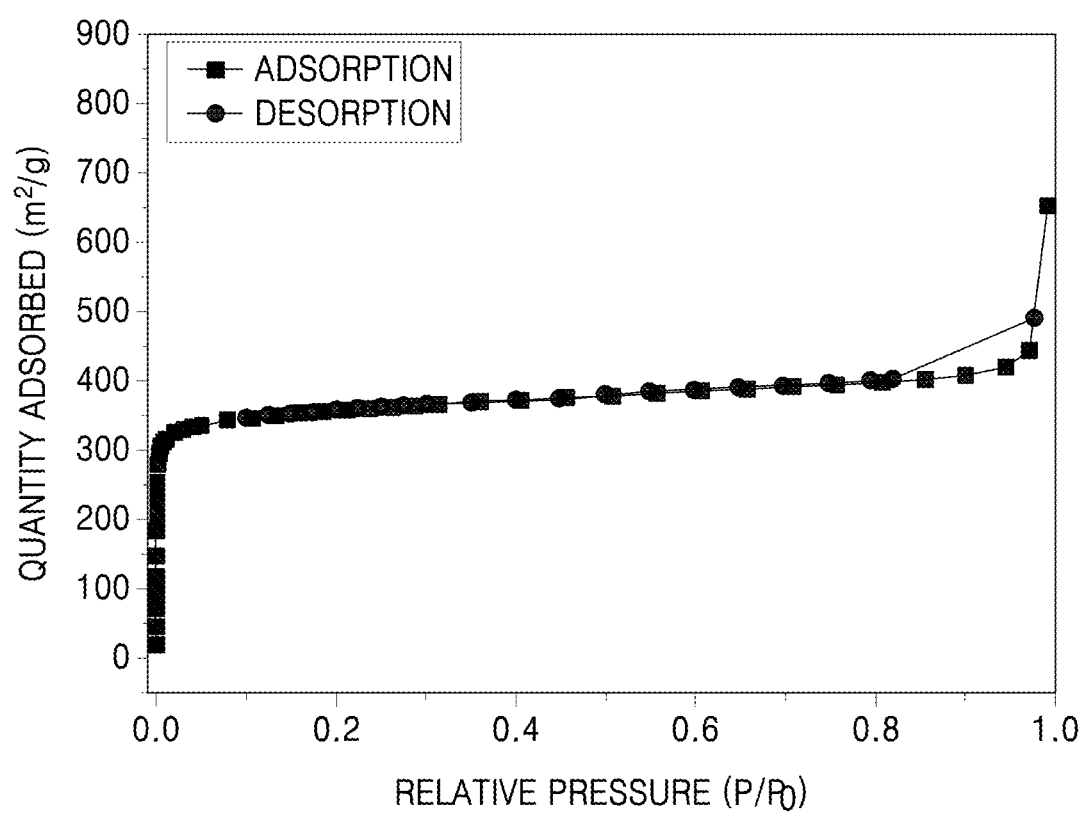
FIG. 3 is a graph quantity adsorbed (square meters per gram, $m^2/g$) versus relative pressure ($P/P_o$) showing nitrogen ($N_2$) adsorption-desorption isotherms of the metal-organic framework of Preparation Example 1.

Referring to FIG. 3, the metal-organic framework of Preparation Example 1 was found to have a specific surface area of about 1120 $m^2/g$ by the BET method. A total pore volume of the metal-organic framework was directly derived based on the specific surface area and the Y-axis of the $N_2$ adsorption-desorption isotherms. A pore size distribution was obtained by the Barrett-Joyner-Halenda (BJH) method, and an average pore size was calculated based on the pore size distribution. The metal-organic framework of Preparation Example 1 had an average pore size of about 3.5 nm.

These results indicate that the metal-organic framework TiMOF of Preparation Example 1 had a mesoporous structure with a specific surface area of 1000 $m^2/g$ or greater.

Evaluation Example 1

Crystalline Evaluation of Electrolyte Membrane

Crystalline characteristics of the electrolyte membranes of Examples 1 and 2 and Comparative Examples 1 to 4 were evaluated by X-ray diffraction (XRD) analysis a D8 ADVANCE X-ray diffractometer (available from Bruker Inc.). The results are shown in Tables 2 and 3 and FIGS. 4A and 4B.

The crystalline characteristics of the electrolyte membranes of Example 1 and Comparative Examples 1 to 3 were evaluated from a degree of crystallinity (DOC) of each electrolyte membrane and a relative degree of crystallinity ($DOC/DOC_{PEO}$) of each electrolyte membrane to a degree of crystallinity ($DOC_{PEO}$) of the electrolyte membrane of Comparative Example 1 including no metal-organic framework.

The crystalline characteristics of the electrolyte membranes of Example 2 and Comparative Example 4 were evaluated from a degree of crystallinity (DOC) of each electrolyte membrane and a relative degree of crystallinity ($DOC/DOC_{PS-PEO-PS}$) of each electrolyte membrane to a degree of crystallinity ($DOC_{PS-PEO-PS}$) of the electrolyte membrane of Comparative Example 4 including no metal-organic framework. The degree of crystallinity (DOC) was obtained using Equation 2.

$$DOC = [A_{cry}/(A_{cry} + A_{amo})]$$ Equation 2

In Equation 2, "$A_{cry}$" indicates the area of the crystalline phase as a total area of two peaks indicating crystalline phases in X-ray diffraction (XRD) data (i.e., a sum of the areas of a first peak ($A_{cry1}$) and a second peak ($A_{cry2}$) at a 2θ of 19° and 23°, respectively), and "$A_{cry} + A_{amo}$" indicates a sum of the "area of crystalline phase and the area of amorphous phase", i.e., a total area of the peaks indicating crystalline phases based on the horizontal plane of X-axis in XRD data.

TABLE 2

| Example | $A_{cry} + A_{amo}$ | $A_{amo}$ | $A_{cry1}$ | $A_{cry2}$ | DOC | $DOC/DOC_{PEO}$ |
|---|---|---|---|---|---|---|
| Example 1 | 9586 | 9019 | 412 | 155 | 0.0591 | 0.3429 |
| Comparative Example 1 | 11365 | 10815 | 850 | 1110 | 0.1724 | 1.0000 |
| Comparative Example 2 | 10025 | 9552 | 677 | 1009 | 0.1681 | 0.9751 |
| Comparative Example 3 | 11069 | 9700 | 719 | 650 | 0.1236 | 0.7171 |

TABLE 3

| Example | $A_{cry} + A_{amo}$ | $A_{amo}$ | $A_{cry1}$ | $A_{cry2}$ | DOC | $DOC/DOC_{PS-PEO-PS}$ |
|---|---|---|---|---|---|---|
| Example 2 | 4900 | 4645 | 220 | 35 | 0.0520 | 0.2112 |
| Comparative Example 4 | 21138 | 15931 | 3057 | 2150 | 0.2463 | 1.0000 |

Referring to Table 2 and FIG. 4A, the electrolyte membrane of Example 1 had a $DOC/DOC_{PEO}$ of 0.3429, which was lower compared to the electrolyte membranes of Comparative Examples 1 to 3.

Referring to Table 3 and FIG. 4B, the electrolyte membrane of Example 2 had a $DOC/DOC_{PS-PEO-PS}$ of 0.2112, which was lower compared to the electrolyte membrane of Comparative Example 4.

Evaluation Example 2

Ionic Conductivity Evaluation of Electrolyte Membrane

The electrolyte membranes of Examples 1 and 2 and Comparative Examples 1 to 4 were used to manufacture cells with stainless steel (SUS) shield electrodes on opposite surfaces of the electrolyte membrane thereof. Complex impedance (Cole-Cole) plots were obtained using an alternating impedance method with applying an alternating voltage between the electrodes of each cell at about 25° C., and the ionic conductivity of each cell was calculated using Equation 1 based on the intercept on the real impedance axis in the complex impedance plots, the thicknesses of the corresponding electrolyte membranes of Examples 1 and 2 and Comparative Examples 1 to 4, and the areas of the corresponding metal electrodes. The results are shown in Table 4 and FIGS. 5A and 5B.

The alternating impedance measurement was conducted using a Solatron SI1260 impedance/gain-phase analyzer) with a 4-probe method. The thickness (I) of electrolyte membrane was 50 μm, and the area (A) of electrode was 1.22 cm².

$$\sigma = I/R \cdot A \qquad \text{Equation 1}$$

(where σ is an ionic conductivity, R is a resistance, I is the thickness of electrolyte membrane, and A is the area of electrode)

TABLE 4

| Example | Ionic conductivity (S/cm) | Resistance (Ω) |
| --- | --- | --- |
| Example 1 | $1.52 \times 10^{-5}$ | 1759 |
| Example 2 | $2.79 \times 10^{-5}$ | 145 |
| Comparative Example 1 | $2.32 \times 10^{-6}$ | 903 |
| Comparative Example 2 | $4.51 \times 10^{-6}$ | 754 |
| Comparative Example 3 | $5.40 \times 10^{-6}$ | 267 |
| Comparative Example 4 | $4.84 \times 10^{-6}$ | 840 |

Figure 5A:
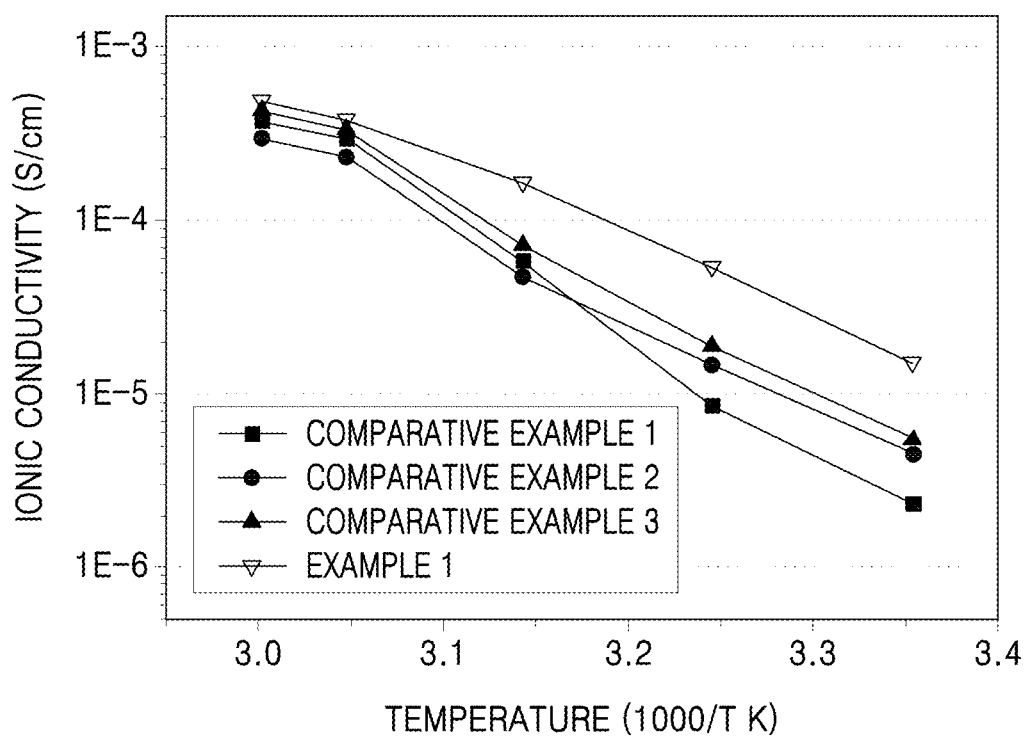
FIG. 5A is a graph of ionic conductivity (Siemens per centimeter, S/cm) versus inverse temperature (1000/T, in Kelvin) illustrating the results of ionic conductivity evaluation on the electrolyte membranes of Example 1 and Comparative Examples 1 to 3.
Figure 5B:
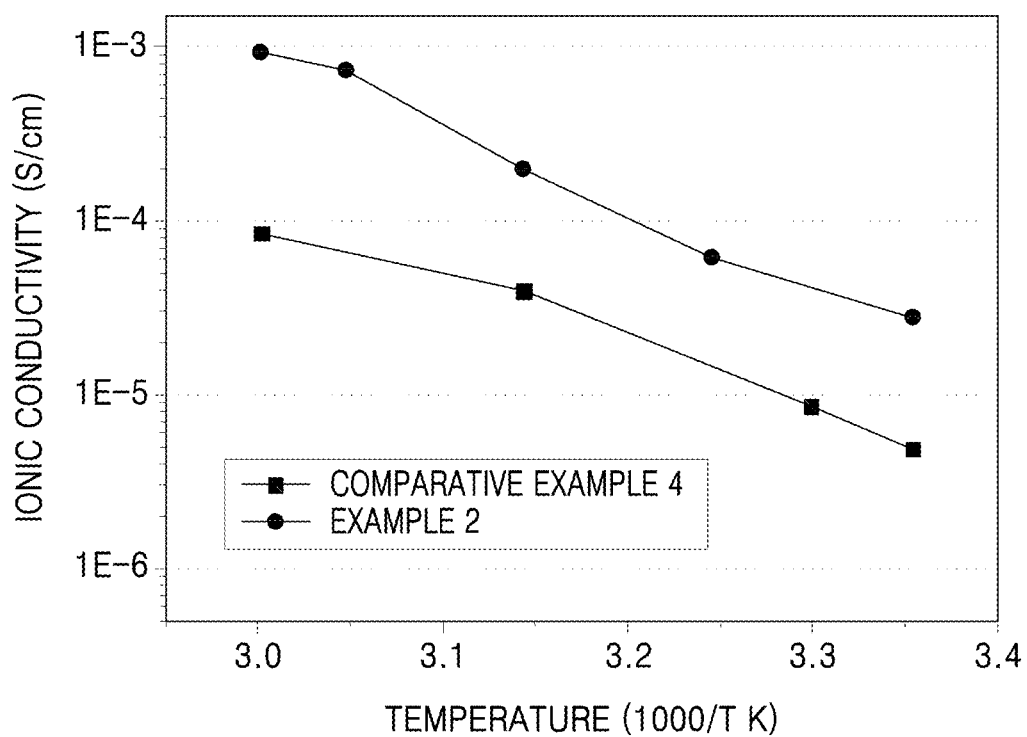
FIG. 5B is a graph of ionic conductivity (Siemens per centimeter, S/cm) versus inverse temperature (1000/T, in Kelvin) illustrating the results of ionic conductivity evaluation on the electrolyte membranes of Example 2 and Comparative Example 4.

Referring to Table 4 and FIGS. 5A and 5B, the electrolyte membranes of Examples 1 and 2 were found to have an ionic conductivity of about $1 \times 10^{-5}$ (S/cm) or higher at room temperature, which were higher than those of the electrolyte membranes of Comparative Examples 1 and 4.

Evaluation Example 3

Electrochemical Stability Evaluation of Electrolyte Membrane

The electrolyte membranes of Examples 1 and 2 and Comparative Examples 1 to 3 were used to manufacture cells with a Li electrode, the electrolyte membrane and SUS electrode, and the electrochemical stability of each cell was evaluated using linear sweep voltammetry (LSV). The results are shown in FIG. 6.

The measurement conditions for LSV were as follows: a voltage range of about 0V to about 6V at 60° C. and a scan rate of about 1 mV/s.

Figure 6:
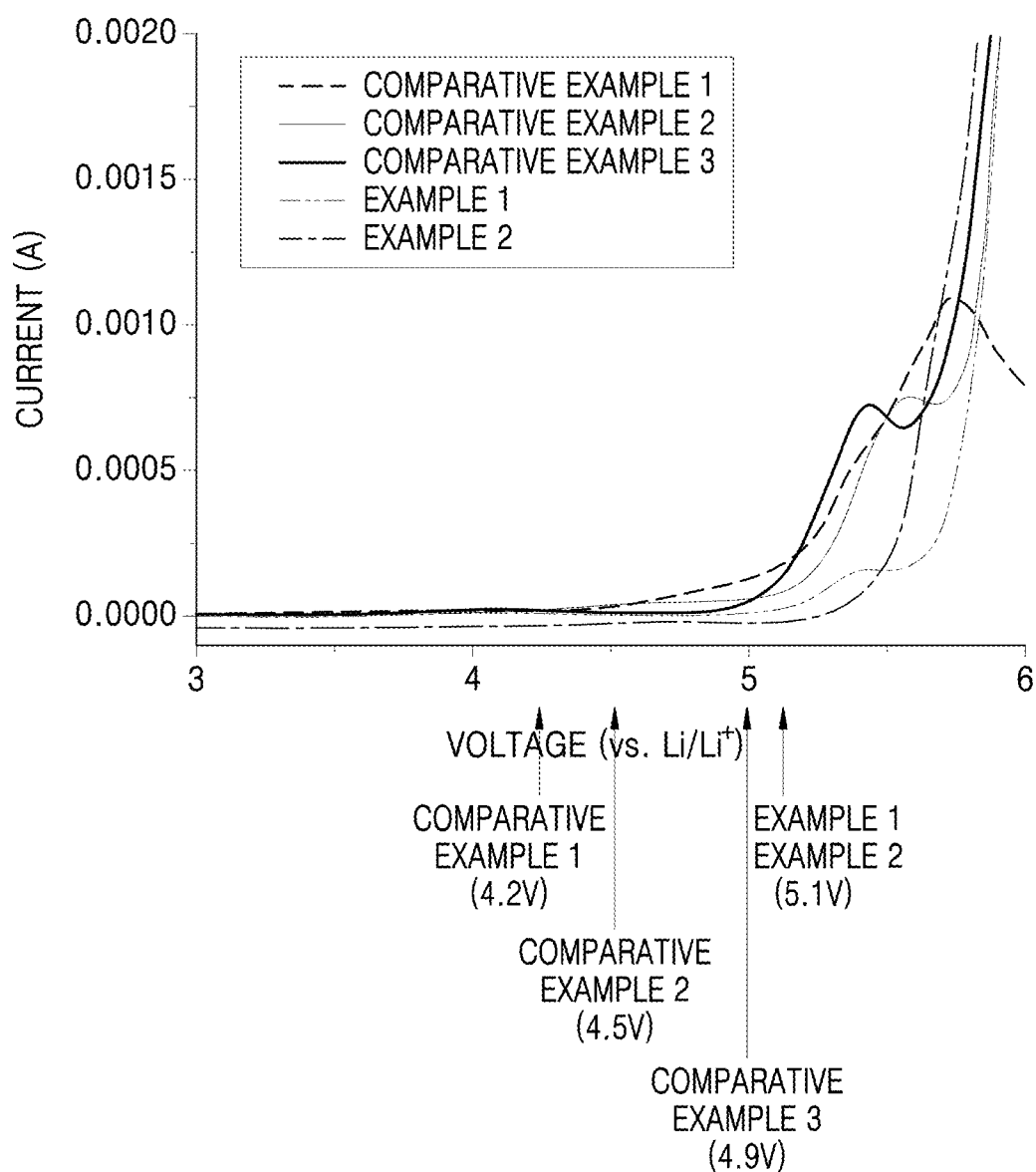
FIG. 6 is a graph of current (amperes, A) versus voltage versus $Li/Li^+$ (V) illustrating the results of electrochemical stability evaluation on the electrolyte membranes of Examples 1 and 2 and Comparative Examples 1 to 3 by linear sweep voltammetry (LSV)

Referring to FIG. 6, the cells including the electrolyte membranes of Examples 1 and 2 were found to be stable at up to a voltage of about 5.10 V with respect to Li⁺/Li, while the cells including the electrolyte membranes of Comparative Examples 1 to 3 were stable at up to a voltage of about 4.20V, 4.50V, and 4.90V, respectively, with respect to Li⁺/Li.

These results indicate that the cells using the electrolyte membranes of Examples 1 and 2 may have improved electrochemical stability compared to the cells including the electrolyte membranes of Comparative Examples 1 to 3.

As described above, according to the one or more of the above embodiments, an electrolyte membrane for an energy storage device may include a metal-organic framework that is uniformly distributed in a matrix including an ion conductive polymer, and thus may have improved mechanical characteristics and lowered crystallinity of the matrix, and consequentially an energy storage device including the electrolyte membrane may have improved ionic conductivity at room temperature and improved electrochemical stability.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electrolyte membrane for an energy storage device, the electrolyte membrane comprising:
    a matrix comprising an ionically conductive polymer composition comprising a polymer and a lithium salt; and
    a metal-organic framework in the matrix,
    wherein the metal-organic framework is in a form of a plurality of primary particles, each having a diameter distribution represented by Inequation 1:

$$0 < \sigma^2/\mu < 1.0, \qquad \text{Inequation 1}$$

wherein the plurality of primary particles has an average particle diameter of 100 nanometers to 400 nanometers, and
    wherein, in Inequation 1, $\sigma^2$ is a diameter variance for the plurality of primary particles obtained by dynamic laser scattering, and μ is an average particle diameter of the plurality of primary particles.

2. The electrolyte membrane of claim 1, wherein the metal-organic framework is porous and crystalline.

3. The electrolyte membrane of claim 1, wherein the metal-organic framework comprises is porous and crystalline and comprises a metal ion or a metal ion cluster which is chemically bound to an organic ligand.

4. The electrolyte membrane of claim 3, wherein the metal ion comprises at least one selected from Ti³⁺, Ti⁴⁺, Fe²⁺, Fe³⁺, V⁴⁺, V³⁺, V²⁺, Y³⁺, Zr⁴⁺, Cu²⁺, and Al³⁺.

5. The electrolyte membrane of claim 3, wherein the organic ligand comprises at least one selected from an aromatic dicarboxylic acid, an aromatic tricarboxylic acid, and an imidazole compound.

6. The electrolyte membrane of claim 1, wherein the metal-organic framework is contained in a range of 0.1 weight percent to 50 weight percent, based on a total weight of the electrolyte membrane for an energy storage device.

7. The electrolyte membrane of claim 1, wherein the polymer of the ionically conductive polymer composition of the matrix is a homopolymer or a block copolymer.

8. The electrolyte membrane of claim 7, wherein the polymer of the ionically conductive polymer composition has a weight average molecular weight of 100,000 to 5,000,000 Daltons.

9. The electrolyte membrane of claim 1, wherein the electrolyte membrane has a degree of crystallinity of 0.01 to 0.50 with respect to a degree of crystallinity of an electrolyte membrane not comprising a metal-organic framework.

10. The electrolyte membrane of claim 1, further comprising an ionic liquid.

11. The electrolyte membrane of claim 1, wherein the electrolyte membrane has an ionic conductivity of $1 \times 10^{-5}$ Siemens per centimeter to $2.8 \times 10^{-5}$ Siemens per centimeter at 25° C.

12. An energy storage device comprising:
    a cathode;
    an anode; and
    an electrolyte disposed between the cathode and the anode and comprising the electrolyte membrane of claim 1.

13. The energy storage device of claim 12, wherein the electrolyte membrane is disposed on at least a region of the anode.

14. The energy storage device of claim 12, wherein the electrolyte membrane is disposed as a separate membrane between the the cathode and the anode.

15. The energy storage device of claim 12, wherein the electrolyte membrane has a monolayered structure.

16. The electrolyte membrane of claim 1, wherein the plurality of primary particles have a diameter distribution represented by:

$$0<\sigma^2/\mu<0.7.$$

17. A method of preparing an electrolyte membrane for an energy storage device, the method comprising:
  contacting an metal ion precursor, an organic ligand precursor, and a solvent to prepare a metal-organic framework;
  adding a matrix comprising an ionically conductive polymer composition comprising a polymer and a lithium salt to a solvent to obtain a mixture; and
  adding the metal-organic framework to the mixture to form a composition; and
  disposing the composition on a substrate to form the electrolyte membrane, wherein the electrolyte membrane comprises
  a matrix comprising an ionically conductive polymer composition comprising a polymer and a lithium salt, and
  a metal-organic framework in the matrix, wherein the metal-organic framework is in a form of a plurality of primary particles each having a diameter distribution represented by Inequation 1:

$$0<\sigma^2/\mu<1.0, \qquad \text{Inequation 1}$$

wherein the plurality of primary particles has an average particle diameter of 100 nanometers to 400 nanometers, and
  wherein, in Inequation 1, $\sigma^2$ is a diameter variance for the plurality of primary particles obtained by dynamic laser scattering, and $\mu$ is an average particle diameter of the plurality of primary particles.

18. The method of claim 17, wherein a mole ratio of the organic ligand precursor to the metal ion precursor is greater than a stoichiometric mole ratio thereof.

19. The method of claim 18, wherein a mole ratio of the organic ligand precursor to the metal ion precursor is greater by 1.1 to 100 times than a stoichiometric mole ratio thereof.

* * * * *